US012632221B2

(12) United States Patent
Harpur et al.

(10) Patent No.: US 12,632,221 B2
(45) Date of Patent: May 19, 2026

(54) SYSTEMS AND METHODS FOR RESILIENT DISTRIBUTION OF RANDOM NUMBERS

(71) Applicant: GAMES GLOBAL OPERATIONS LIMITED, Douglas (IM)

(72) Inventors: Rory Angus Harpur, Durban North (ZA); Jonathan Bruce Wortmann, Ballart (AU)

(73) Assignee: Games Global Operations Limited, Douglas (IM)

( * ) Notice: Subject to any disclaimer, the term of this patent is extended or adjusted under 35 U.S.C. 154(b) by 1032 days.

(21) Appl. No.: 17/551,521

(22) Filed: Dec. 15, 2021

(65) Prior Publication Data

US 2022/0197597 A1    Jun. 23, 2022

(30) Foreign Application Priority Data

Dec. 17, 2020    (GB) ...................................... 2020046

(51) Int. Cl.
*G06F 7/58*        (2006.01)
*G07F 17/32*       (2006.01)
(52) U.S. Cl.
CPC ............ *G06F 7/58* (2013.01); *G07F 17/3227* (2013.01)
(58) Field of Classification Search
CPC ............ G06F 7/58–7/588; G07F 17/34; G07F 17/32–17/42; G07F 17/3269; G07F 17/3225; G07F 17/3211; G07F 17/3213; G07F 17/323; G07C 15/00; G07C 15/006
See application file for complete search history.

(56) References Cited

U.S. PATENT DOCUMENTS

| | | | |
|---|---|---|---|
| 5,704,835 | A | 1/1998 | Dietz, II |
| 6,142,872 | A | 11/2000 | Walker et al. |
| 6,146,271 | A | 11/2000 | Kadlic |

(Continued)

FOREIGN PATENT DOCUMENTS

| | | | |
|---|---|---|---|
| AU | 2003246319 | | 10/2003 |
| AU | 2011253848 | A1 | 1/2014 |

(Continued)

OTHER PUBLICATIONS

Gambling Commission, Machine standards: category C, Revision 3, available at https://assets.ctfassets.net/j16ev64qyf61/2GNpL9dNnxsBYSDuOtQHnl/30562e2b20058bea7474b8b353b08a9c/Machine-standards-category-C.pdf Section 5.8 (Year: 2012).*

(Continued)

*Primary Examiner* — Emily E Larocque
*Assistant Examiner* — Jerome Anthony Klosterman, II
(74) *Attorney, Agent, or Firm* — MCDONNELL BOEHNEN HULBERT & BERGHOFF LLP

(57) ABSTRACT

A remote device may include a random number generator, a ruleset defining random number modifications, a processor, and a memory. The memory may contain program instructions that, when executed by the processor, cause the remote device to perform operations comprising: receiving, from an electronic device, a single message including a request for a plurality of random numbers; obtaining, from the random number generator, the plurality of random numbers; applying, to the plurality of random numbers, the random number modifications; and transmitting, to the electronic device, the plurality of random numbers as modified.

20 Claims, 14 Drawing Sheets

(56)                References Cited

U.S. PATENT DOCUMENTS

| 6,186,894 B1 | 2/2001 | Mayeroff |
| 6,190,255 B1 | 2/2001 | Thomas et al. |
| 6,203,429 B1 | 3/2001 | Demar et al. |
| 6,224,483 B1 | 5/2001 | Mayeroff |
| 6,231,442 B1 | 5/2001 | Mayeroff |
| 6,234,897 B1 | 5/2001 | Frohm et al. |
| 6,251,013 B1 | 6/2001 | Bennett |
| 6,315,560 B1 | 11/2001 | Krouglicof et al. |
| 6,322,309 B1 | 11/2001 | Thomas et al. |
| 6,379,248 B1 | 4/2002 | Jorasch et al. |
| 6,439,993 B1 | 8/2002 | O'Halloran |
| 6,482,089 B2 | 11/2002 | DeMar et al. |
| 6,506,117 B2 | 1/2003 | DeMar et al. |
| 6,508,707 B2 | 1/2003 | DeMar et al. |
| 6,520,855 B2 | 2/2003 | DeMar et al. |
| 6,561,904 B2 | 5/2003 | Locke et al. |
| 6,609,971 B2 | 8/2003 | Vancura |
| 6,645,074 B2 | 11/2003 | Thomas et al. |
| 6,712,697 B2 | 3/2004 | Acres |
| 6,743,102 B1 | 6/2004 | Fiechter et al. |
| 6,852,028 B2 | 2/2005 | Vancura |
| 6,855,054 B2 | 2/2005 | White et al. |
| 6,869,360 B2 | 3/2005 | Marks et al. |
| 6,905,412 B2 | 6/2005 | Thomas et al. |
| 6,939,228 B2 | 9/2005 | Shimizu |
| 7,063,617 B2 | 6/2006 | Brosnan et al. |
| 7,090,580 B2 | 8/2006 | Rodgers et al. |
| 7,172,505 B2 | 2/2007 | Vancura |
| 7,195,560 B2 | 3/2007 | DeMar et al. |
| 7,237,775 B2 | 7/2007 | Thomas et al. |
| 7,258,611 B2 | 8/2007 | Bigelow et al. |
| 7,291,068 B2 | 11/2007 | Bryant et al. |
| 7,316,609 B2 | 1/2008 | Dunn et al. |
| 7,331,862 B2 | 2/2008 | Rodgers et al. |
| 7,331,866 B2 | 2/2008 | Rodgers et al. |
| 7,331,867 B2 | 2/2008 | Baelocher et al. |
| 7,341,518 B2 | 3/2008 | Muskin |
| 7,381,134 B2 | 6/2008 | Cuddy et al. |
| 7,390,260 B2 | 6/2008 | Englman |
| 7,393,278 B2 | 7/2008 | Gerson et al. |
| 7,419,429 B2 | 9/2008 | Taylor |
| 7,452,271 B2 | 11/2008 | DeMar et al. |
| 7,520,809 B2 | 4/2009 | Thomas et al. |
| 7,553,231 B2 | 6/2009 | Rodgers et al. |
| 7,584,505 B2 | 9/2009 | Mondri |
| 7,618,319 B2 | 11/2009 | Casey et al. |
| 7,736,222 B2 | 6/2010 | Casey et al. |
| 7,801,040 B1 | 9/2010 | Singh et al. |
| 7,819,737 B2 | 10/2010 | Englman et al. |
| 7,850,521 B2 | 12/2010 | Rodgers et al. |
| 7,857,695 B2 | 12/2010 | Rodgers et al. |
| 7,901,283 B2 | 3/2011 | Thomas et al. |
| 7,922,579 B2 | 4/2011 | Walker et al. |
| 7,950,994 B2 | 5/2011 | Berman et al. |
| 8,029,358 B2 | 10/2011 | Bigelow et al. |
| 8,030,078 B2 | 10/2011 | Robichaud |
| RE43,297 E | 4/2012 | Taylor |
| 8,157,634 B2 | 4/2012 | Englman et al. |
| 8,177,630 B2 | 5/2012 | Bryant |
| 8,235,790 B2 | 8/2012 | Yoshizawa |
| 8,272,944 B2 | 9/2012 | Englman et al. |
| 8,360,840 B2 | 1/2013 | Bennett |
| 8,382,576 B2 | 2/2013 | Nakamura |
| 8,430,743 B2 | 4/2013 | Moshal |
| 8,444,467 B2 | 5/2013 | Englman et al. |
| 8,449,382 B2 | 5/2013 | Bryant |
| 8,449,383 B2 | 5/2013 | Bryant |
| 8,460,094 B2 | 6/2013 | Bigelow et al. |
| 8,480,480 B2 | 7/2013 | Thomas et al. |
| 8,529,332 B2 | 9/2013 | Bennett et al. |
| 8,535,143 B2 | 9/2013 | Hornik et al. |
| 8,540,565 B2 | 9/2013 | Burghard et al. |
| 8,585,484 B2 | 11/2013 | Louie |
| 8,591,312 B2 | 11/2013 | Roukis et al. |
| 8,591,316 B2 | 11/2013 | Bryant |
| 8,602,867 B2 | 12/2013 | Owen et al. |
| 8,616,950 B2 | 12/2013 | Robichaud |
| 8,632,393 B2 | 1/2014 | Bryant |
| 8,636,584 B2 | 1/2014 | Bryant |
| 8,641,517 B2 | 2/2014 | Bryant |
| 8,647,194 B2 | 2/2014 | Bigelow et al. |
| 8,651,940 B2 | 2/2014 | Loat et al. |
| 8,702,489 B2 | 4/2014 | Cuddy et al. |
| 8,721,423 B2 | 5/2014 | Saito |
| 8,734,222 B2 | 5/2014 | Owen et al. |
| 8,734,237 B2 | 5/2014 | Moshal |
| 8,747,207 B2 | 6/2014 | Thomas et al. |
| 8,834,249 B2 | 9/2014 | Bryant |
| 8,864,568 B2 | 10/2014 | Mizue |
| 8,864,570 B2 | 10/2014 | Jackson |
| 8,876,589 B2 | 11/2014 | Strom |
| 8,974,288 B2 | 3/2015 | Welty et al. |
| 9,092,938 B2 | 7/2015 | Robichaud |
| 9,098,976 B2 | 8/2015 | Zimmermann |
| 9,129,480 B2 | 9/2015 | Nakamura |
| 9,135,781 B2 | 9/2015 | Nakamura |
| 9,135,782 B2 | 9/2015 | Nakamura |
| 9,165,436 B2 | 10/2015 | Welty et al. |
| 9,208,657 B2 | 12/2015 | Fujisawa et al. |
| 9,214,071 B2 | 12/2015 | Hornik et al. |
| 9,224,270 B2 | 12/2015 | Lee et al. |
| 9,230,411 B2 | 1/2016 | Englman et al. |
| 9,336,658 B2 | 5/2016 | Suda |
| 9,336,659 B2 | 5/2016 | Beria |
| 9,361,756 B2 | 6/2016 | Bryant et al. |
| 9,412,239 B2 | 8/2016 | Gugler |
| 9,424,720 B2 | 8/2016 | Suda |
| 9,564,001 B2 | 2/2017 | Owen et al. |
| 9,659,456 B2 | 5/2017 | Van Linden |
| 9,685,035 B2 | 6/2017 | Schattauer et al. |
| 9,697,694 B2 | 7/2017 | Beria |
| 9,792,776 B2 | 10/2017 | Bigelow et al. |
| 9,830,780 B2 | 11/2017 | Cuddy et al. |
| 9,852,588 B2 | 12/2017 | Roukis et al. |
| 9,911,280 B2 | 3/2018 | Beria |
| 9,934,646 B2 | 4/2018 | Igesund |
| 9,940,784 B2 | 4/2018 | Schattauer et al. |
| 9,959,703 B2 | 5/2018 | Igesund |
| 9,997,012 B2 | 6/2018 | Wortmann et al. |
| 10,043,348 B2 | 8/2018 | Meyer |
| 10,068,435 B2 | 9/2018 | Gugler |
| 10,078,942 B2 | 9/2018 | Suda |
| 10,147,264 B1 | 12/2018 | Halvorson |
| 10,169,956 B2 | 1/2019 | Beria |
| 10,649,734 B2 | 5/2020 | Zhang |
| 2001/0009865 A1 | 7/2001 | DeMar |
| 2001/0031659 A1 | 10/2001 | Perrie et al. |
| 2002/0025847 A1 | 2/2002 | Thomas et al. |
| 2002/0039920 A1 | 4/2002 | Bryant |
| 2002/0043759 A1 | 4/2002 | Vancura |
| 2002/0045474 A1 | 4/2002 | Singer et al. |
| 2002/0068623 A1 | 6/2002 | Gauselmann |
| 2002/0132659 A1 | 9/2002 | DeMar et al. |
| 2002/0137560 A1 | 9/2002 | DeMar et al. |
| 2002/0137561 A1 | 9/2002 | DeMar et al. |
| 2002/0142823 A1 | 10/2002 | DeMar et al. |
| 2002/0151359 A1 | 10/2002 | Rowe |
| 2003/0060259 A1 | 3/2003 | Mierau et al. |
| 2003/0064810 A1 | 4/2003 | Okada |
| 2003/0073483 A1 | 4/2003 | Glavich et al. |
| 2003/0155715 A1 | 8/2003 | Walker et al. |
| 2003/0162585 A1 | 8/2003 | Bigelow et al. |
| 2003/0162588 A1 | 8/2003 | Brosnan et al. |
| 2003/0181238 A1 | 9/2003 | DeMar et al. |
| 2003/0190943 A1 | 10/2003 | Walker et al. |
| 2003/0199307 A1 | 10/2003 | DeMar et al. |
| 2003/0199309 A1 | 10/2003 | DeMar et al. |
| 2004/0032086 A1 | 2/2004 | Barragan |
| 2004/0048646 A1 | 3/2004 | Visocnik |
| 2004/0072607 A1 | 4/2004 | Thomas et al. |
| 2004/0097280 A1 | 5/2004 | Gauselmann |
| 2004/0162134 A1 | 8/2004 | Walker et al. |
| 2004/0185930 A1 | 9/2004 | Thomas et al. |
| 2004/0219968 A1 | 11/2004 | Fiden et al. |

(56) References Cited

U.S. PATENT DOCUMENTS

| | | |
|---|---|---|
| 2004/0242312 A1 | 12/2004 | Gomez |
| 2004/0254011 A1 | 12/2004 | Muskin |
| 2004/0259640 A1 | 12/2004 | Gentles et al. |
| 2005/0010715 A1 | 1/2005 | Davies et al. |
| 2005/0043082 A1 | 2/2005 | Peterson et al. |
| 2005/0054420 A1 | 3/2005 | Cregan et al. |
| 2005/0130731 A1 | 6/2005 | Englman |
| 2005/0130737 A1 | 6/2005 | Englman |
| 2005/0153770 A1 | 7/2005 | Vancura |
| 2005/0153778 A1 | 7/2005 | Nelson et al. |
| 2005/0170883 A1 | 8/2005 | Muskin |
| 2005/0181867 A1 | 8/2005 | Thomas et al. |
| 2005/0192099 A1 | 9/2005 | Nguyen |
| 2005/0239545 A1 | 10/2005 | Rowe |
| 2006/0005239 A1 | 1/2006 | Mondri |
| 2006/0030396 A1 | 2/2006 | Marks et al. |
| 2006/0084494 A1 | 4/2006 | Belger et al. |
| 2006/0264254 A1 | 11/2006 | Aoki |
| 2006/0281525 A1 | 12/2006 | Borissov |
| 2007/0026933 A1 | 2/2007 | Tanimura |
| 2007/0054732 A1 | 3/2007 | Baerlocher |
| 2007/0060254 A1 | 3/2007 | Muir |
| 2007/0060303 A1 | 3/2007 | Govender et al. |
| 2007/0060314 A1 | 3/2007 | Baerlocher et al. |
| 2007/0060317 A1 | 3/2007 | Martin |
| 2007/0123340 A1 | 5/2007 | Vancura |
| 2007/0167226 A1 | 7/2007 | Kelly et al. |
| 2007/0265062 A1 | 11/2007 | Thomas et al. |
| 2007/0287529 A1 | 12/2007 | Kojima |
| 2008/0039171 A1 | 2/2008 | Slomiany et al. |
| 2008/0070673 A1 | 3/2008 | Bennett et al. |
| 2008/0076525 A1 | 3/2008 | Kim |
| 2008/0076574 A1 | 3/2008 | Okada |
| 2008/0108411 A1 | 5/2008 | Jensen et al. |
| 2008/0113742 A1 | 5/2008 | Amos et al. |
| 2008/0197573 A1 | 8/2008 | Palmer |
| 2008/0254875 A1 | 10/2008 | Fujimoto et al. |
| 2008/0287178 A1 | 11/2008 | Berman et al. |
| 2009/0042652 A1 | 2/2009 | Baerlocher et al. |
| 2009/0054129 A1 | 2/2009 | Yoshimura et al. |
| 2009/0069071 A1 | 3/2009 | Aoki |
| 2009/0098930 A1 | 4/2009 | Kato |
| 2009/0104979 A1 | 4/2009 | Ruymann |
| 2009/0117979 A1 | 5/2009 | Decasa et al. |
| 2009/0131145 A1 | 5/2009 | Aoki et al. |
| 2009/0156303 A1 | 6/2009 | Kiely et al. |
| 2009/0227340 A1 | 9/2009 | Yoshizawa |
| 2009/0227356 A1 | 9/2009 | Moroney |
| 2009/0305769 A1 | 12/2009 | Plowman |
| 2009/0305770 A1 | 12/2009 | Bennett et al. |
| 2009/0325667 A1 | 12/2009 | Weber |
| 2009/0325674 A1 | 12/2009 | Hosokawa |
| 2010/0004048 A1 | 1/2010 | Brito |
| 2010/0004050 A1 | 1/2010 | Caputo |
| 2010/0022297 A1 | 1/2010 | Saunders |
| 2010/0029381 A1 | 2/2010 | Vancura |
| 2010/0049785 A1* | 2/2010 | Stoyanov ................ H04L 43/08 |
| | | 709/203 |
| 2010/0056249 A1 | 3/2010 | Yamauchi |
| 2010/0120525 A1 | 5/2010 | Baerlocher et al. |
| 2010/0124988 A1 | 5/2010 | Amos et al. |
| 2010/0197377 A1 | 8/2010 | Aoki et al. |
| 2010/0240437 A1* | 9/2010 | Ditton ................ G07F 17/3244 |
| | | 463/20 |
| 2010/0323780 A1 | 12/2010 | Acres |
| 2011/0003630 A1 | 1/2011 | Rasmussen et al. |
| 2011/0028202 A1 | 2/2011 | Naicker et al. |
| 2011/0065492 A1 | 3/2011 | Acres |
| 2011/0098101 A1 | 4/2011 | Gomez et al. |
| 2011/0117987 A1 | 5/2011 | Aoki et al. |
| 2011/0118001 A1 | 5/2011 | Vann |
| 2011/0124394 A1 | 5/2011 | Thomas et al. |
| 2012/0015713 A1 | 1/2012 | Cannon |
| 2012/0064961 A1 | 3/2012 | Vancura |
| 2012/0122546 A1 | 5/2012 | Lange |

| | | |
|---|---|---|
| 2012/0122547 A1 | 5/2012 | Aoki et al. |
| 2012/0244928 A1 | 9/2012 | Visser |
| 2012/0258787 A1 | 10/2012 | Bennett |
| 2012/0276980 A1 | 11/2012 | Moroney |
| 2012/0295688 A1 | 11/2012 | Watkins et al. |
| 2013/0023329 A1 | 1/2013 | Saunders |
| 2013/0065662 A1 | 3/2013 | Watkins et al. |
| 2013/0143635 A1 | 6/2013 | Arora |
| 2013/0157733 A1 | 6/2013 | Thorne et al. |
| 2013/0184047 A1 | 7/2013 | Haykin et al. |
| 2013/0244762 A1 | 9/2013 | Walker et al. |
| 2013/0281191 A1 | 10/2013 | Thomas et al. |
| 2013/0288793 A1 | 10/2013 | Fujisawa et al. |
| 2013/0344939 A1 | 12/2013 | Aoki et al. |
| 2014/0051494 A1 | 2/2014 | Marks et al. |
| 2014/0066164 A1* | 3/2014 | Okada ................ G07F 17/3211 |
| | | 463/20 |
| 2014/0066169 A1 | 3/2014 | Watkins et al. |
| 2014/0135096 A1 | 5/2014 | Aida et al. |
| 2014/0179400 A1 | 6/2014 | Lee |
| 2014/0222881 A1* | 8/2014 | Pirvu ................ G07F 17/3223 |
| | | 708/255 |
| 2014/0228091 A1 | 8/2014 | Berman et al. |
| 2014/0274292 A1 | 9/2014 | Suda |
| 2014/0287814 A1 | 9/2014 | Berman et al. |
| 2014/0295939 A1 | 10/2014 | Thomas et al. |
| 2014/0323198 A1 | 10/2014 | Tuck |
| 2014/0339767 A1 | 11/2014 | Hirato |
| 2014/0342807 A1 | 11/2014 | Vancura |
| 2015/0018069 A1 | 1/2015 | Montenegro et al. |
| 2015/0057068 A1 | 2/2015 | Burghard |
| 2015/0213677 A1 | 7/2015 | Haykin et al. |
| 2015/0248810 A1 | 9/2015 | Wortmann et al. |
| 2015/0248811 A1 | 9/2015 | Wortmann et al. |
| 2015/0287276 A1 | 10/2015 | Humphrey et al. |
| 2015/0302704 A1 | 10/2015 | Montenegro et al. |
| 2015/0363999 A1 | 12/2015 | Little |
| 2016/0104345 A1 | 4/2016 | MacGregor et al. |
| 2016/0140795 A1 | 5/2016 | Fong et al. |
| 2016/0180637 A1 | 6/2016 | Honeycutt et al. |
| 2016/0328910 A1 | 11/2016 | Shaik |
| 2016/0351005 A1 | 12/2016 | Igesund |
| 2016/0351006 A1 | 12/2016 | Igesund |
| 2017/0069160 A1 | 3/2017 | Bennett |
| 2017/0092041 A1 | 3/2017 | Kudo |
| 2017/0092042 A1 | 3/2017 | Nakamura |
| 2017/0162003 A9 | 6/2017 | Burghard |
| 2017/0213416 A1 | 7/2017 | Wortmann |
| 2017/0316648 A1 | 11/2017 | Wortmann |
| 2017/0316649 A1 | 11/2017 | Wortmann |
| 2017/0316651 A1 | 11/2017 | Wortmann et al. |
| 2018/0122183 A1 | 5/2018 | Wortmann |
| 2018/0122184 A1 | 5/2018 | Wortmann |
| 2018/0122189 A1 | 5/2018 | Wortmann |
| 2018/0225926 A1 | 8/2018 | Wortmann |
| 2018/0286174 A1 | 10/2018 | Merkel et al. |
| 2018/0286175 A1 | 10/2018 | Kuhlmann et al. |
| 2018/0374296 A1 | 12/2018 | Bennett |
| 2019/0019370 A1 | 1/2019 | Ono |
| 2019/0108723 A1* | 4/2019 | Acres ................ G07F 17/3211 |
| 2019/0244471 A1* | 8/2019 | Gelman ................ G07F 17/326 |

FOREIGN PATENT DOCUMENTS

| | | |
|---|---|---|
| AU | 2013251288 | 5/2014 |
| CA | 2827968 | 3/2014 |
| CA | 2868773 | 4/2015 |
| CN | 108206737 A | 6/2018 |
| EP | 1351180 | 10/2003 |
| EP | 2228780 A1 | 9/2010 |
| EP | 2615591 | 3/2013 |
| EP | 2713347 | 4/2014 |
| EP | 2866211 | 4/2015 |
| EP | 2894612 | 7/2015 |
| EP | 2916299 | 9/2015 |
| GB | 2139390 | 11/1984 |
| GB | 2393018 | 3/2004 |
| JP | H11110192 A | 4/1999 |
| WO | 2002/41963 | 5/2002 |

(56)                    References Cited

FOREIGN PATENT DOCUMENTS

| WO | 2006/027677 | | 3/2006 |
| WO | 2008/063394 | A1 | 5/2008 |
| WO | 2014/118352 | A1 | 8/2014 |
| ZA | 201400816 | | 10/2014 |

OTHER PUBLICATIONS

"Sort." Merriam-Webster.com Dictionary, Merriam-Webster, https://www.merriam-webster.com/dictionary/sort. Accessed Jun. 11, 2025.*
Australian Government, IP Australia, Notice of Acceptance mailed on Sep. 25, 2013, issued in connection with Australian Patent Application No. 2011253848, 2 pages.
Australian Government, IP Australia, Examination Report No. 4 mailed on Mar. 9, 2018, issued in connection with Australian Patent Application No. 2016202966, 3 pages.
Australian Government, IP Australia, Examination Report No. 2 mailed on Mar. 6, 2018, issued in connection with Australian Patent Application No. 2017200271, 3 pages.
Australian Government, IP Australia, Examination Report No. 3 mailed on Jun. 5, 2018, issued in connection with Australian Patent Application No. 2017200271, 3 pages.
Australian Government, IP Australia, Examination Report No. 2 mailed on May 11, 2018, issued in connection with Australian Patent Application No. 2017202474, 4 pages.
Australian Government, IP Australia, Examination Report No. 2 mailed on May 14, 2018, issued in connection with Australian Patent Application No. 2017202574, 4 pages.
Australian Government, IP Australia, Examination Report No. 2 mailed on May 14, 2018, issued in connection with Australian Patent Application No. 2017202577, 3 pages.
Australian Government, IP Australia, Examination Report No. 2 mailed on May 14, 2018, issued in connection with Australian Patent Application No. 2017202579, 4 pages.
Australian Government, IP Australia, Examination Report No. 1 mailed on Mar. 20, 2018, issued in connection with Australian Patent Application No. 2017235913, 2 pages.
Australian Government, IP Australia, Examination Report No. 1 mailed on Mar. 6, 2018, issued in connection with Australian Patent Application No. 2017235921, 2 pages.
Australian Government, IP Australia, Examination Report No. 1 mailed on Mar. 6, 2018, issued in connection with Australian Patent Application No. 2017235939, 2 pages.
Australian Government, IP Australia, Examination Report No. 1 mailed on Mar. 6, 2018, issued in connection with Australian Patent Application No. 2017235945, 2 pages.
Canadian Intellectual Property Office, Examiner's Report mailed on Feb. 6, 2014, issued in connection with Canadian Patent Application No. 2,760,112, 3 pages.
Canadian Intellectual Property Office, Examiner's Report mailed on Mar. 18, 2015, issued in connection with Canadian Patent Application No. 2,760,112, 6 pages.
Canadian Intellectual Property Office, Final Office Action mailed on Dec. 2, 2016, issued in connection with Canadian Patent Application No. 2,760,112, 5 pages.
Canadian Intellectual Property Office, Examiner's Report mailed on May 11, 2018, issued in connection with Canadian Patent Application No. 2,964,233, 5 pages.
Canadian Intellectual Property Office, Examiner's Report mailed on Mar. 29, 2018, issued in connection with Canadian Patent Application No. 2,964,558, 6 pages.
Canadian Intellectual Property Office, Examiner's Report mailed on May 11, 2018, issued in connection with Canadian Patent Application No. 2,964,587, 5 pages.
Canadian Intellectual Property Office, Examiner's Report mailed on Apr. 24, 2018, issued in connection with Canadian Patent Application No. 2,964,739, 5 pages.
European Patent Office, Office Action mailed on Sep. 10, 2013, issued in connection with EP Application No. 11194636.4, 5 pages.

United Kingdom Intellectual Property Office, Search Report mailed on Apr. 13, 2018, issued in connection with Great Britain Patent Application No. 1618347.7, 6 pages.
United Kingdom Intellectual Property Office, Search Report mailed on Apr. 17, 2018, issued in connection with Great Britain Patent Application No. 1618349.3, 7 pages.
United Kingdom Intellectual Property Office, Search Report mailed on Apr. 17, 2018, issued in connection with Great Britain Patent Application No. 1618352.7, 7 pages.
United Kingdom Intellectual Property Office, Search Report mailed on Apr. 13, 2018, issued in connection with Great Britain Patent Application No. 1618353.5, 6 pages.
Notice of Allowance mailed on Mar. 8, 2018, issued in connection with U.S. Appl. No. 15/140,945, filed Apr. 28, 2016, 5 pages.
Notice of Allowance mailed on Apr. 11, 2018, issued in connection with U.S. Appl. No. 15/485,984, filed Apr. 12, 2017, 7 pages.
Non-Final Office Action mailed on May 22, 2018, issued in connection with U.S. Appl. No. 15/487,022, filed Apr. 13, 2017, 12 pages.
Canadian Office Action, Canadian Application No. 2,964,587 dated Apr. 9, 2019, 6 pages.
Combined Search and Examination Report under Sections 17 and 18(3), Application No. GB2020046.5, dated May 12, 2022, 8 pages.
Australian Government, IP Australia, Examination Report No. 1 mailed on Mar. 28, 2017, issued in connection with Australian Patent Application No. 2016202966, 2 pages.
Australian Government, IP Australia, Examination Report No. 1 mailed on Mar. 29, 2017, issued in connection with Australian Patent Application No. 2016202965, 3 pages.
Australian Government, IP Australia, Patent Examination Report No. 1, mailed on Dec. 20, 2012, Issued in connection with Australian Patent Application No. 2011253848, 4 pages.
Canadian Intellectual Property Office, Examiner's Report mailed on Dec. 7, 2016, issued in connection with CA Application No. 2929222, 3 pages.
Canadian Intellectual Property Office, Office Action mailed on Mar. 13, 2017, issued in connection with Canadian Patent Application No. 2929218, 6 pages.
Canadian Intellectual Property Office, Examiner's Report mailed on Feb. 5, 2013, issued in connection with CA Application No. 27602112, 2 pages.
European Patent Office, European Search Report dated Jul. 27, 2016, issued in connection with EP Application No. 16171834.1, 8 pages.
European Patent Office, European Search Report dated Jun. 28, 2016, issued in connection with EP Application No. 16171832.5, 8 pages.
European Patent Office, Extended European Search Report mailed on Feb. 24, 2012, issued in connection with EP Application No. 11194636.4, 6 pages.
European Patent Office, Extended European Search Report mailed on Oct. 26, 2010, issued in connection with EP Application No. 10251152.4, 8 pages.
European Patent Office, Supplementary European Search Report mailed on Oct. 8, 2008, issued in connection with EP Application No. 05789874.4, 6 pages.
Final Office Action mailed on Sep. 14, 2012, issued in connection with U.S. Appl. No. 12/511,391, filed Jul. 29, 2009, 14 pages.
Final Office Action mailed on Jun. 23, 2010, issued in connection with U.S. Appl. No. 10/550,744, filed Aug. 24, 2006, 13 pages.
Final Office Action mailed on Sep. 28, 2009, issued in connection with U.S. Appl. No. 10/550,744, filed Aug. 24, 2006, 11 pages.
Intellectual Property Office, Combined Search Report and Abbreviated Examination Report mailed on Nov. 29, 2016, issued in connection with Application No. GB1509339.6, 7 pages.
Intellectual Property Office, Combined Search Report and Abbreviated Examination Report mailed on Nov. 29, 2016, issued in connection with Application No. GB1509340.4, 7 pages.
International Bureau, International Preliminary Report on Patentability mailed Mar. 13, 2007, issued in connection with International Application No. PCT/IB2005/002678, filed on Sep. 9, 2005, 4 pages.

(56)　　　　　References Cited

OTHER PUBLICATIONS

International Searching Authority, International Search Report and Written Opinion mailed on Jan. 16, 2007, issued in connection with International Application No. PCT/IB2005/002678, filed on Sep. 9, 2005, 8 pages.
Non-Final Office Action mailed on Apr. 4, 2008, issued in connection with U.S. Appl. No. 10/550,744, filed Aug. 24, 2006, 8 pages.
Non-Final Office Action mailed on Dec. 10, 2012, issued in connection with U.S. Appl. No. 12/974,690, filed Dec. 21, 2009, 25 pages.
Non-Final Office Action mailed on Dec. 24, 2009, issued in connection with U.S. Appl. No. 10/550,744, filed Aug. 24, 2006, 12 pages.
Non-Final Office Action mailed on Mar. 29, 2012, issued in connection with U.S. Appl. No. 12/511,391, filed Jul. 29, 2009, 10 pages.
Non-Final Office Action mailed on Nov. 29, 2013, issued in connection with U.S. Appl. No. 13/856,124, filed Apr. 3, 2013, 19 pages.
Non-Final Office Action mailed on Jul. 31, 2013, issued in connection with U.S. Appl. No. 13/856,124, filed Apr. 3, 2013, 19 pages.
Notice of Allowability mailed on Nov. 26, 2010, issued in connection with U.S. Appl. No. 10/550,744, filed Aug. 24, 2006, 4 pages.
Notice of Allowance mailed on Apr. 10, 2014, issued in connection with U.S. Appl. No. 13/856,124, filed Apr. 3, 2013, 7 pages.
Notice of Allowance mailed on Mar. 11, 2013, issued in connection with U.S. Appl. No. 12/974,690, filed Dec. 21, 2009, 14 pages.
Wortmann, Jonathan, U.S. Appl. No. 15/485,984, filed Apr. 12, 2017, 62 pages.
Wortmann, Jonathan, U.S. Appl. No. 15/487,869, filed Apr. 14, 2017, 46 pages.
Wortmann, Jonathan, U.S. Appl. No. 15/487,022, filed Apr. 13, 2017, 60 pages.
Wortmann, Jonathan, U.S. Appl. No. 15/487,838, filed Apr. 14, 2017, 64 pages.
European Patent Office, Extended European Search Report mailed on Jun. 6, 2017, issued in connection with Application No. EP 17153144.5, 9 pages.
Australian Government, IP Australia, Examination Report No. 2 mailed on Jul. 14, 2017, issued in connection with Australian Patent Application No. 2016202966, 6 pages.
Australian Government, IP Australia, Examination Report No. 1 mailed on Oct. 14, 2017, issued in connection with Australian Patent Application No. 2017200271, 4 pages.
Australian Government, IP Australia, Examination Report No. 2 mailed on Jun. 26, 2017, issued in connection with Australian Patent Application No. 2016202965, 2 pages.
Australian Government, IP Australia, Examination Report No. 3 mailed on Oct. 12, 2017, issued in connection with Australian Patent Application No. 2016202965, 3 pages.
Non-Final Office Action mailed on Oct. 18, 2017, issued in connection with U.S. Appl. No. 15/140,945, filed Apr. 28, 2016, 11 pages.
Wortmann, Jonathan, U.S. Appl. No. 15/795,798, filed Oct. 27, 2017, 79 pages.
Wortmann, Jonathan, U.S. Appl. No. 15/796,122, filed Oct. 27, 2017, 73 pages.
Wortmann, Jonathan, U.S. Appl. No. 15/796,380, filed Oct. 27, 2017, 79 pages.
Examination Report, Canadian Patent App. No. 3,140,971, mailed Aug. 20, 2024.
Non-Final Office Action mailed on Dec. 26, 2018, issued in connection with U.S. Appl. No. 15/392,946, filed Dec. 28, 2016, 13 pages.
Non-Final Office Action mailed on Jan. 16, 2019, issued in connection with U.S. Appl. No. 15/487,838, filed Apr. 14, 2017, 12 pages.
Canadian Intellectual Property Office, Examiner's Report mailed on Jan. 15, 2019, issued in connection with Canadian Patent Application No. 2,929,218, 6 pages.

Australian Examination Report No. 4 mailed on Sep. 28, 2018, issued in connection with Australian Patent Application No. 2017200271, 5 pages.
Notice of Allowance mailed on Oct. 29, 2018, issued in connection with U.S. Appl. No. 15/487,022, filed Apr. 13, 2017, 5 pages.
Notice of Allowance mailed on Jul. 18, 2018, issued in connection with U.S. Appl. No. 15/487,869, filed Apr. 14, 2017, 9 pages.
United Kingdom Intellectual Property Office, Examination Report mailed on Jul. 30, 2018, issued in connection with Great Britain Patent Application No. 1701938.1, 6 pages.
Non-Final Office Action mailed on Sep. 25, 2018, issued in connection with U.S. Appl. No. 16/056,721, filed Aug. 7, 2018, 10 pages.
Notice of Allowance mailed on Jan. 8, 2019, issued in connection with U.S. Appl. No. 16/056,721, filed Aug. 7, 2018, 5 pages.
Notice of Allowance mailed on Feb. 21, 2019, issued in connection with U.S. Appl. No. 16/056,721, filed Aug. 7, 2018, 7 pages.
Australian Government, IP Australia, Examination Report No. 2 mailed on Aug. 9, 2018, issued in connection with Australian Patent Application No. 2017235913, 4 pages.
Australian Government, IP Australia, Examination Report No. 3 mailed on Jan. 15, 2019, issued in connection with Australian Patent Application No. 2017235913, 3 pages.
Australian Government, IP Australia, Examination Report No. 2 mailed on Jun. 25, 2018, issued in connection with Australian Patent Application No. 2017235921, 3 pages.
Australian Government, IP Australia, Examination Report No. 3 mailed on Sep. 28, 2018, issued in connection with Australian Patent Application No. 2017235921, 3 pages.
Australian Government, IP Australia, Examination Report No. 4 mailed on Jan. 31, 2019, issued in connection with Australian Patent Application No. 2017235921, 3 pages.
Australian Government, IP Australia, Examination Report No. 5 mailed on Mar. 4, 2019 issued in connection with Australian Patent Application No. 2017235921, 3 pages.
Australian Government, IP Australia, Examination Report No. 2 mailed on Aug. 21, 2018, issued in connection with Australian Patent Application No. 2017235939, 4 pages.
Australian Government, IP Australia, Examination Report No. 3 mailed on Jan. 18, 2019, issued in connection with Australian Patent Application No. 2017235939, 3 pages.
Australian Government, IP Australia, Examination Report No. 4 mailed on Mar. 6, 2019, issued in connection with Australian Patent Application No. 2017235939, 3 pages.
Australian Government, IP Australia, Examination Report No. 2 mailed on Jul. 24, 2018, issued in connection with Australian Patent Application No. 2017235945, 4 pages.
Australian Government, IP Australia, Examination Report No. 3 mailed on Feb. 4, 2019, issued in connection with Australian Patent Application No. 2017235945, 3 pages.
Australian Government, IP Australia, Examination Report No. 4 mailed on Mar. 5, 2019, issued in connection with Australian Patent Application No. 2017235945, 3 pages.
Canadian Intellectual Property Office, Examiner's Report mailed on Nov. 1, 2018, issued in connection with Canadian Patent Application No. 2,954,790, 5 pages.
European Patent Office, Office Action mailed on Aug. 21, 2018, issued in connection with European Patent Application No. 17153144.5, 10 pages.
United Kingdom Intellectual Property Office, Combined Search Report mailed on Sep. 20, 2017, issued in connection with Great Britain Patent Application No. 1607374.4, 7 pages.
Australian Government, IP Australia, Examination Report No. 1 mailed on Oct. 12, 2018, issued in connection with Australian Patent Application No. 2018200695, 4 pages.
Examination Report, UK Patent App. No. GB2020046.5, mailed Mar. 21, 2023.
Examination Report, Canadian Patent App. No. 3,140,971, mailed Jan. 4, 2023.
Examination Report, UK Patent App. No. GB2020046.5, mailed Aug. 30, 2023.

(56)           References Cited

OTHER PUBLICATIONS

Exceltv, Jordan Goldmeier, "Everyday" Random Shuffling with Formulas, Nov. 22, 2015, available from https://excel.tv/everyday-random-shuffling-with-formulas-2/ [accessed Aug. 23, 2023].

Spreadsheets Made Easy, "Randomly Sort a List in Excel", Aug. 15, 2017, available from https://www.spreadsheetsmadeeasy.com/how-to-randomize-a-list-in-excel/ [accessed Aug. 23, 2023].

Canadian Intellectual Property Office, Examiner's Report mailed on Jan. 16, 2018, issued in connection with Canadian Patent Application No. 2,929,218, 8 pages.

Australian Government, IP Australia, Examination Report No. 3 mailed on Nov. 21, 2017, issued in connection with Australian Patent Application No. 2016202966, 4 pages.

Notice of Allowance mailed on Dec. 20, 2017, issued in connection with U.S. Appl. No. 15/141,010, filed Apr. 28, 2016, 8 pages.

Non-Final Office Action mailed on Jan. 29, 2018, issued in connection with U.S. Appl. No. 15/487,869, filed Apr. 14, 2017, 12 pages.

Canadian Intellectual Property Office, Examiner's Report mailed on Dec. 19, 2017, issued in connection with Canadian Patent Application No. 2,954,790, 3 pages.

United Kingdom Intellectual Property Office, Search Report mailed on Jun. 28, 2017, issued in connection with Great Britain Patent Application No. 1601306.2, 6 pages.

Canadian Intellectual Property Office, Examiner's Report mailed on Dec. 19, 2017, issued in connection with Canadian Patent Application No. 2,929,222, 6 pages.

European Patent Office, Office Action mailed on Aug. 23, 2017, issued in connection with EP Application No. 16171832.5, 7 pages.

Non-Final Office Action mailed on Oct. 18, 2017, issued in connection with U.S. Appl. No. 15/140,945, filed Apr. 28, 2016, 12 pages.

Notice of Allowance mailed on Jan. 16, 2018, issued in connection with U.S. Appl. No. 15/140,945, filed Apr. 28, 2016, 5 pages.

Non-Final Office Action mailed on Feb. 20, 2018, issued in connection with U.S. Appl. No. 15/485,984, filed Apr. 12, 2017, 11 pages.

Notice of Allowance mailed on Feb. 13, 2018, issued in connection with U.S. Appl. No. 15/141,010, filed Apr. 28, 2016, 5 pages.

Australian Government, IP Australia, Examination Report No. 1 mailed on Jan. 30, 2018, issued in connection with Australian Patent Application No. 2017202577, 2 pages.

Australian Government, IP Australia, Examination Report No. 1 mailed on Jan. 30, 2018, issued in connection with Australian Patent Application No. 2017202579, 2 pages.

Australian Government, IP Australia, Examination Report No. 1 mailed on Jan. 30, 2018, issued in connection with Australian Patent Application No. 2017202474, 2 pages.

Australian Government, IP Australia, Examination Report No. 4 mailed on Feb. 19, 2018, issued in connection with Australian Patent Application No. 2016202965, 3 pages.

United Kingdom Intellectual Property Office, Search Report mailed on Aug. 16, 2017, issued in connection with Great Britain Patent Application No. 1607379.3, 6 pages.

United Kingdom Intellectual Property Office, Search Report mailed on Aug. 11, 2017, issued in connection with Great Britain Patent Application No. 1607380.1, 8 pages.

Extended European Search Report and Written Opinion, Application No. EP 21214496.8, mailed May 6, 2022, 8 pages.

Australian Government, IP Australia, Examination Report No. 1 mailed on Jan. 30, 2018, issued in connection with Australian Patent Application No. 2017202574, 2 pages.

Australian Government, IP Australia, Examination Report No. 3 mailed on Jul. 23, 2018, issued in connection with Australian Patent Application No. 2017202574, 4 pages.

Australian Government, IP Australia, Examination Report No. 4 mailed on Jan. 15, 2019, issued in connection with Australian Patent Application No. 2017202574, 4 pages.

* cited by examiner

|   | 3 | 4 | 5 |
|---|---|---|---|
| J | 7 | 14 | 21 |
| Q | 8 | 16 | 24 |
| K | 9 | 18 | 27 |
| A | 10 | 20 | 40 |

450

| SPINS TO PLAY OUT TO USER | WINNINGS |
|---|---|
| 1 | 61 |
| 2 | 58 |
| 3 | 58 |
| 4 | 56 |
| 5 | 54 |
| 6 | 54 |
| 7 | 49 |
| 8 | 48 |
| 9 | 47 |
| 10 | 44 |
| 11 | 38 |
| 12 | 37 |
| 13 | 37 |
| 14 | 35 |
| 15 | 35 |
| 16 | 29 |
| 17 | 27 |
| 18 | 24 |
| 19 | 21 |
| 20 | 17 |
| 21 | 16 |
| 22 | 16 |
| 23 | 15 |
| 24 | 15 |
| 25 | 10 |
| 26 | 10 |
| 27 | 10 |
| 28 | 9 |
| 29 | 9 |
| 30 | 9 |
| 31 | 9 |
| 32 | 8 |
| 33 | 7 |
| 34 | 7 |
| 35 - 100 | 0 |

460

430    432    434    436    438

424
418
426
420
428
422

440
442
444

400

33 SPINS LEFT!

Q  Q  A  J  K
J  J  J  A  J
Q  K  K  Q  J

10    CREDITS PER SPIN
7     THIS WIN
7     TOTAL WINNINGS
      462

PAUSE 430    432    434    436    438

424
418
426
420
428
422

440
442
444

400

32 SPINS LEFT!

10    CREDITS PER SPIN
-     THIS WIN
7     TOTAL WINNINGS 430    432    434    436    438

424
418
426
420
428
422
440
442
444
400

17 SPINS LEFT!

| J | J | J | J | K |
| A | A | A | Q | J |
| K | J | K | A | Q |

10  CREDITS PER SPIN

24  THIS WIN

212  TOTAL WINNINGS

PAUSE

462

430    432    434    436    438

424
418
426
420
428
422
440
442
444
400

16 SPINS LEFT!

10  CREDITS PER SPIN

-  THIS WIN

212  TOTAL WINNINGS

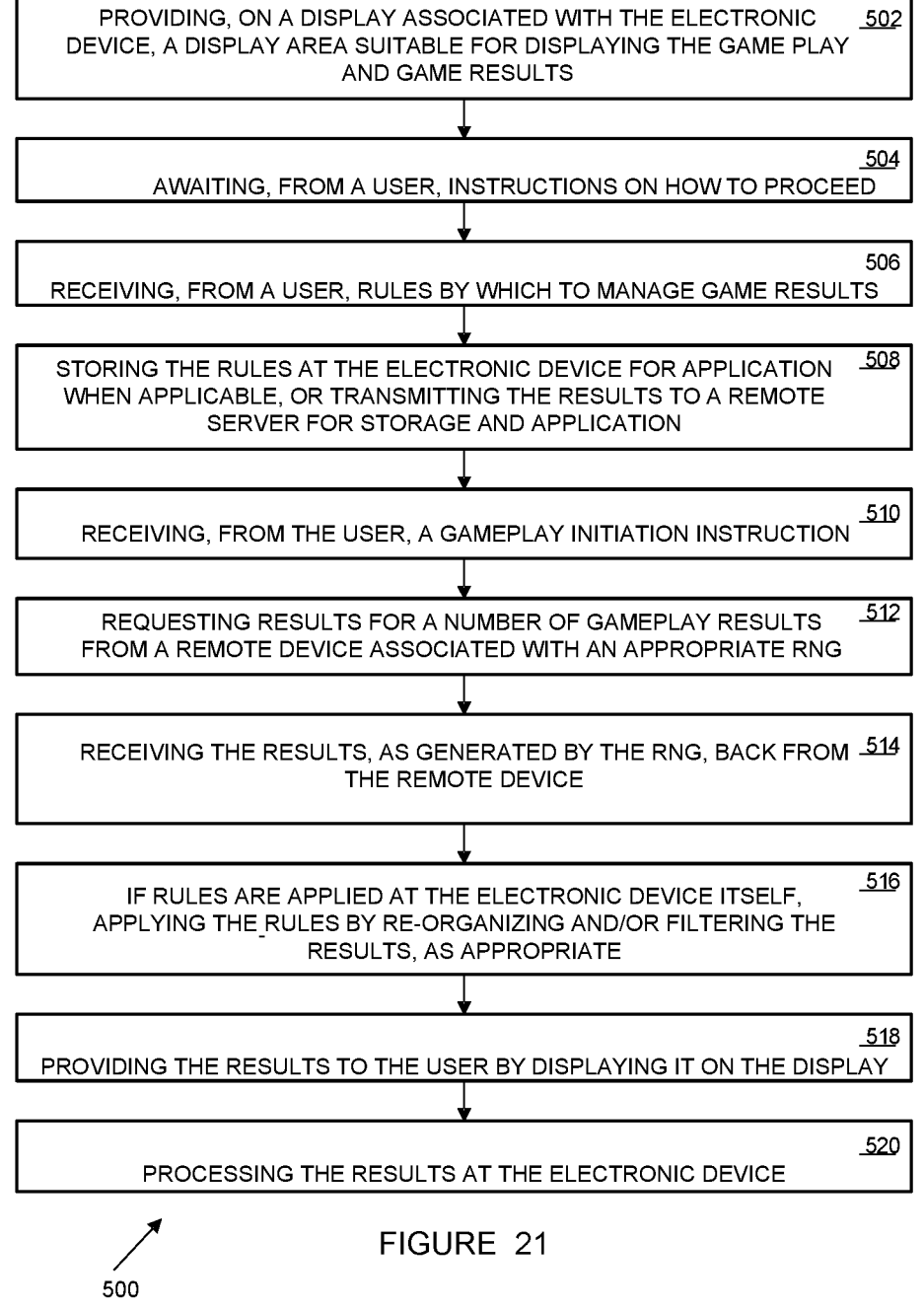

PROVIDING, ON A DISPLAY ASSOCIATED WITH THE ELECTRONIC     502
DEVICE, A DISPLAY AREA SUITABLE FOR DISPLAYING THE GAME PLAY
AND GAME RESULTS

504
AWAITING, FROM A USER, INSTRUCTIONS ON HOW TO PROCEED

506
RECEIVING, FROM A USER, RULES BY WHICH TO MANAGE GAME RESULTS

STORING THE RULES AT THE ELECTRONIC DEVICE FOR APPLICATION     508
WHEN APPLICABLE, OR TRANSMITTING THE RESULTS TO A REMOTE
SERVER FOR STORAGE AND APPLICATION

510
RECEIVING, FROM THE USER, A GAMEPLAY INITIATION INSTRUCTION

REQUESTING RESULTS FOR A NUMBER OF GAMEPLAY RESULTS     512
FROM A REMOTE DEVICE ASSOCIATED WITH AN APPROPRIATE RNG

RECEIVING THE RESULTS, AS GENERATED BY THE RNG, BACK FROM     514
THE REMOTE DEVICE

IF RULES ARE APPLIED AT THE ELECTRONIC DEVICE ITSELF,     516
APPLYING THE RULES BY RE-ORGANIZING AND/OR FILTERING THE
RESULTS, AS APPROPRIATE

518
PROVIDING THE RESULTS TO THE USER BY DISPLAYING IT ON THE DISPLAY

520
PROCESSING THE RESULTS AT THE ELECTRONIC DEVICE

Figure 22:
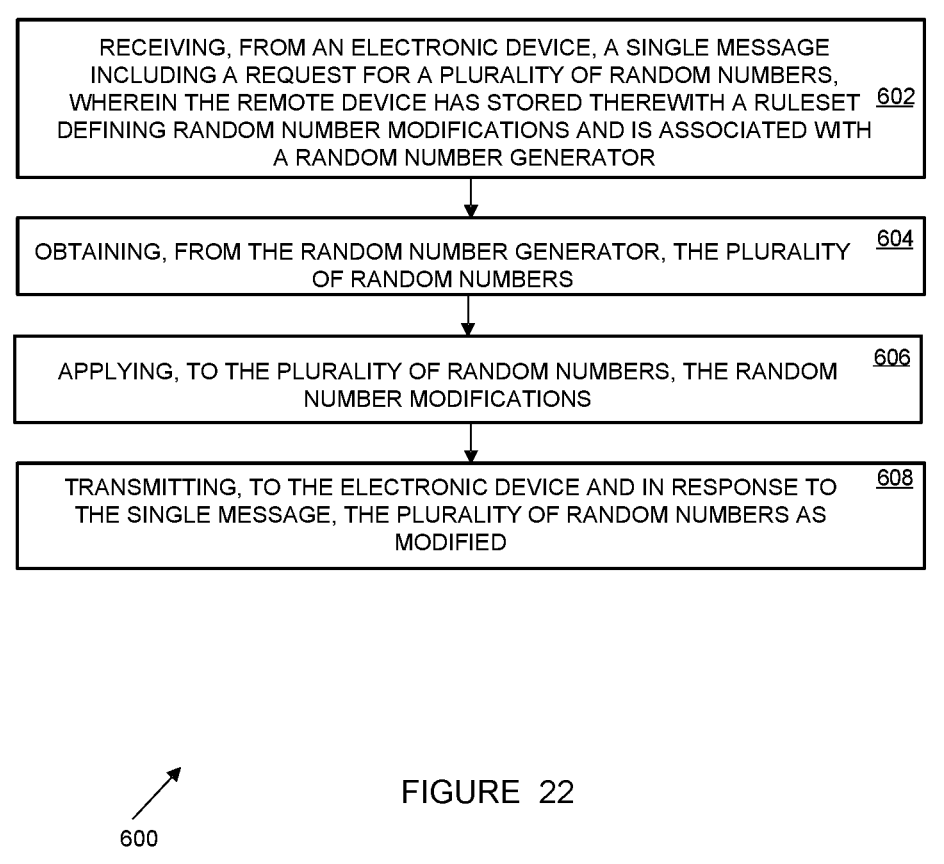

RECEIVING, FROM AN ELECTRONIC DEVICE, A SINGLE MESSAGE INCLUDING A REQUEST FOR A PLURALITY OF RANDOM NUMBERS, WHEREIN THE REMOTE DEVICE HAS STORED THEREWITH A RULESET 602 DEFINING RANDOM NUMBER MODIFICATIONS AND IS ASSOCIATED WITH A RANDOM NUMBER GENERATOR

OBTAINING, FROM THE RANDOM NUMBER GENERATOR, THE PLURALITY 604 OF RANDOM NUMBERS

APPLYING, TO THE PLURALITY OF RANDOM NUMBERS, THE RANDOM 606 NUMBER MODIFICATIONS

TRANSMITTING, TO THE ELECTRONIC DEVICE AND IN RESPONSE TO 608 THE SINGLE MESSAGE, THE PLURALITY OF RANDOM NUMBERS AS MODIFIED

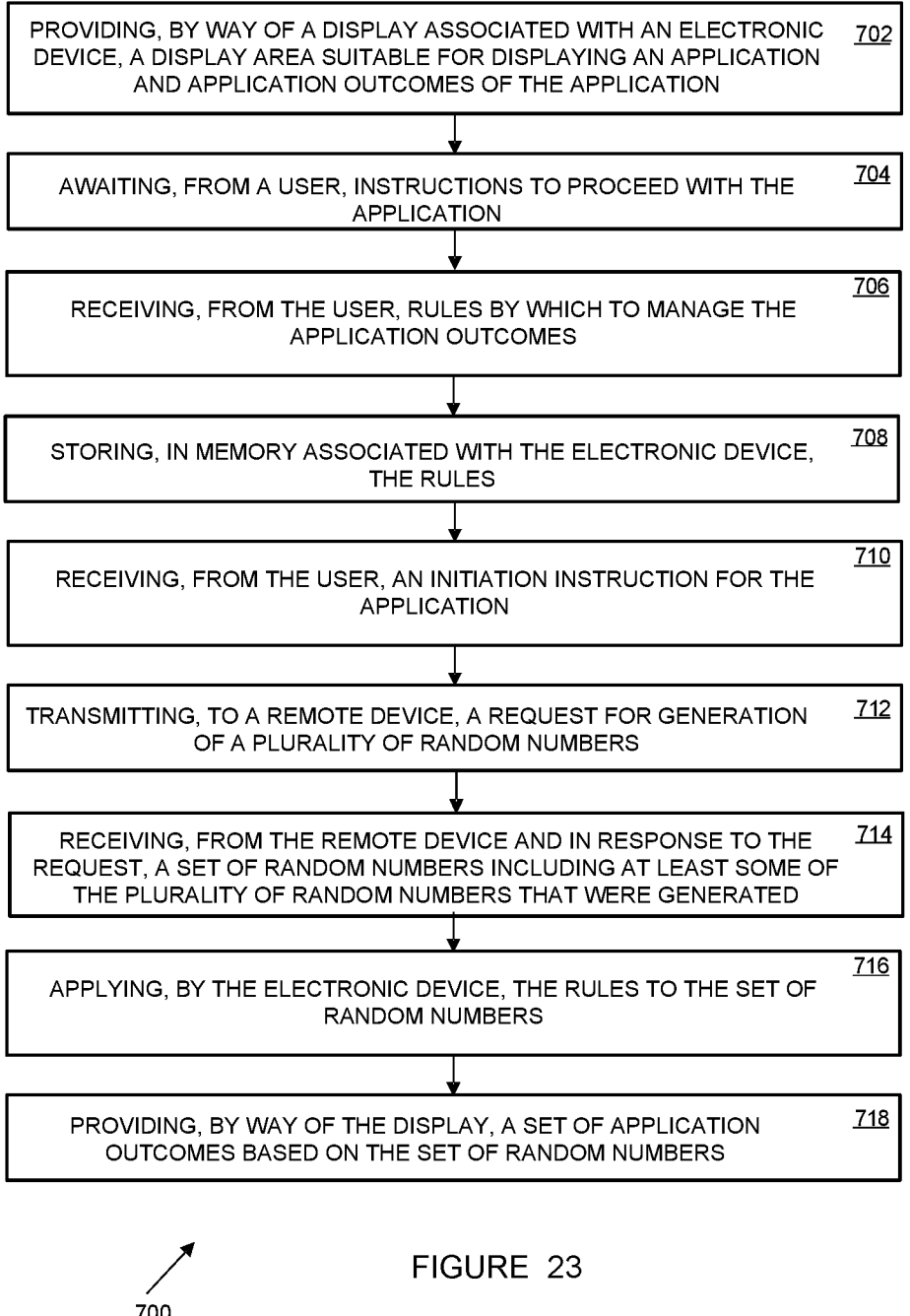

PROVIDING, BY WAY OF A DISPLAY ASSOCIATED WITH AN ELECTRONIC DEVICE, A DISPLAY AREA SUITABLE FOR DISPLAYING AN APPLICATION AND APPLICATION OUTCOMES OF THE APPLICATION 702

AWAITING, FROM A USER, INSTRUCTIONS TO PROCEED WITH THE APPLICATION 704

RECEIVING, FROM THE USER, RULES BY WHICH TO MANAGE THE APPLICATION OUTCOMES 706

STORING, IN MEMORY ASSOCIATED WITH THE ELECTRONIC DEVICE, THE RULES 708

RECEIVING, FROM THE USER, AN INITIATION INSTRUCTION FOR THE APPLICATION 710

TRANSMITTING, TO A REMOTE DEVICE, A REQUEST FOR GENERATION OF A PLURALITY OF RANDOM NUMBERS 712

RECEIVING, FROM THE REMOTE DEVICE AND IN RESPONSE TO THE REQUEST, A SET OF RANDOM NUMBERS INCLUDING AT LEAST SOME OF THE PLURALITY OF RANDOM NUMBERS THAT WERE GENERATED 714

APPLYING, BY THE ELECTRONIC DEVICE, THE RULES TO THE SET OF RANDOM NUMBERS 716

PROVIDING, BY WAY OF THE DISPLAY, A SET OF APPLICATION OUTCOMES BASED ON THE SET OF RANDOM NUMBERS 718

SYSTEMS AND METHODS FOR RESILIENT DISTRIBUTION OF RANDOM NUMBERS

CROSS-REFERENCE TO RELATED APPLICATION

This application claims priority to U.K. Patent Application No. 2020046.5, filed Dec. 17, 2020, which is hereby incorporated by reference in its entirety.

BACKGROUND

Data transfer in digital environments may require multiple data transfer events in order to facilitate the transfer of multiple individual set of requests and associated responses. An example is where several individual, intermittent requests for data is made, corresponding with intermittent times at which such data is needed. As an example, a random number or value may be requested multiple times over several communication sessions. Requests may be intermittently transmitted from an electronic device to a remote device, for example a remote server, which server may in turn generate or retrieve an appropriate response and return it to the electronic device. The random numbers may be generated in various ways through use of a true or pseudo random number generator (RNG).

It may be beneficial to reduce the amount of data transmitted between an electronic device and remote device employing an RNG when requests and responses are to be transmitted and/or exchanged between such devices, and to do so in a way that is resilient to lost or poor network connectivity.

SUMMARY

Viewed from a first aspect, the disclosure provides a computer-implemented method. The method includes receiving a single request for a number of multiple, random results. Additionally, the method includes generating the number of results. Optionally, the method includes organizing the results and/or removing some of the results according to at least one defined criterion. Further, the method includes transmitting the results as part of a single data transfer event, the results allowing the display of multiple outcome events.

In a first implementation, a remote device is provided. The remote device includes a random number generator, a ruleset defining random number modifications, a processor, and memory containing program instructions that, when executed by the processor, cause the remote device to perform operations. The operations include receiving, from an electronic device, a single message including a request for a plurality of random numbers. The operations further include obtaining, from the random number generator, the plurality of random numbers. Additionally, the operations include applying, to the plurality of random numbers, the random number modifications. The operations also include transmitting, to the electronic device and in response to the single message, the plurality of random numbers as modified.

In a second implementation, a method is provided. The method is a computer-implemented method that includes receiving, by a remote device and from an electronic device, a single message including a request for a plurality of random numbers. The remote device has stored therewith a ruleset defining random number modifications and is associated with a random number generator. The method further includes obtaining, from the random number generator, the plurality of random numbers. Additionally, the method includes applying, to the plurality of random numbers, the random number modifications. The method also includes transmitting, to the electronic device and in response to the single message, the plurality of random numbers as modified.

In a third implementation, a medium is provided. The medium is a computer-readable medium comprising computer-implementable instructions configured to cause a processor of a remote device to perform operations. The operations include receiving, from an electronic device, a single message including a request for a plurality of random numbers. The remote device has stored therewith a ruleset defining random number modifications and is associated with a random number generator. The operations further include obtaining, from the random number generator, the plurality of random numbers. Additionally, the operations include applying, to the plurality of random numbers, the random number modifications. The operations also include transmitting, to the electronic device and in response to the single message, the plurality of random numbers as modified.

In a fourth implementation, a system is provided. The system includes means for receiving, from an electronic device, a single message including a request for a plurality of random numbers. A remote device has stored therewith a ruleset defining random number modifications and is associated with a random number generator. The system further includes means for obtaining, from the random number generator, the plurality of random numbers. Additionally, the system includes means for applying, to the plurality of random numbers, the random number modifications. The system also includes means for transmitting, to the electronic device and in response to the single message, the plurality of random numbers as modified.

In a fifth implementation, a computer-implemented method is provided. The method includes providing, by way of a display associated with an electronic device, a display area suitable for displaying an application and application outcomes of the application. The method further includes awaiting, from a user, instructions to proceed with the application. Additionally, the method includes receiving, from the user, rules by which to manage the application outcomes. The method also includes storing, in memory associated with the electronic device, the rules. Furthermore, the method includes receiving, from the user, an initiation instruction for the application. Additionally, the method includes transmitting, to a remote device, a request for generation of a plurality of random numbers. The method further includes receiving, from the remote device and in response to the request, a set of random numbers including at least some of the plurality of random numbers that were generated. The method also includes applying, by the electronic device, the rules to the set of random numbers. Finally, the method includes providing, by way of the display, a set of application outcomes based on the set of random numbers.

In embodiments of the disclosure in which a computer software product is used, the product may be non-transitory and store instructions on physical media such as a DVD, or a solid-state drive, or a hard drive. Alternatively, the product may be transitory and in the form of instructions provided over a connection such as a network connection which is linked to a network such as the Internet.

These aspects, as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE FIGURES

FIG. 21 is a flowchart in accordance with example embodiments.

FIG. 22 is another flowchart in accordance with example embodiments.

FIG. 23 is yet another flowchart in accordance with example embodiments.

DETAILED DESCRIPTION

I. Introduction

Figure 1:
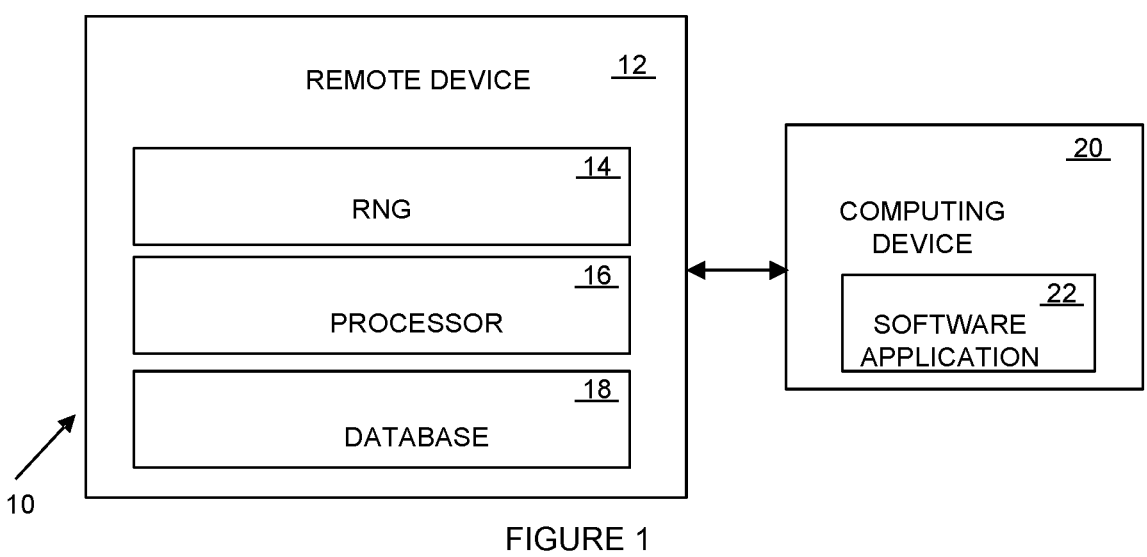
FIG. 1 is a simplified block diagram of an encryption system in accordance with example embodiments.

This specification describes, among other things, example embodiments including, but not limited to, embodiments pertaining to performing aspects of an outcome event involving a randomly determined result. The outcome event may relate to a software application that uses an RNG to generate results for outcome events. An electronic device may be used to provide the outcome event for a user, for example the user's electronic device, or a dedicated outcome event machine.

The RNG may be located remotely from the device used by the user. If, for example, the user participates in an outcome event on an electronic device from a remote location, a suitable RNG under control of a provider or operator of the software application may be remotely located. The remote device hosting the RNG may be in data communication with the user's electronic device via a communication network such as the Internet. The electronic device may, instead of requesting a single result from the RNG, request multiple results via a single request. Then, the RNG may generate the requested number of multiple results, which may then be transmitted to the electronic device as part of a single message, in a single data transfer event. This may reduce the overall data to be transmitted, as, for example, a single request for ten results instead of ten individual requests will require less overall data to be transmitted because some overhead related to packet headers can be omitted. In addition, the time required for requesting a total of ten results may be reduced due to the reduction in data to be transmitted.

When considering this overhead, some data elements need not be transmitted as often if a single message is transmitted compared to when multiple messages deliver the same information. Data such as source and destination network addresses, error detection codes, sequencing information, or the like, may be provided just once rather than multiple times. This may contribute to the reduction in data to be transmitted, and also to an associated reduction in the duration of data transfer.

Further, the multiple randomly-determined results may be re-organised into an order specified by some predetermined set of rules, typically according to the impact the results have on the receiving application or a user. For example, the random results may be ordered lowest to highest, highest to lowest, alternating patterns of high-low, or the like. In some instances, certain results may be removed from the set of data or combined into a single result for presentation to the application or the user. This may further reduce data to be transferred, with the accompanying advantages outlined above.

The re-arranged and/or modified results may then be received by an electronic device, and a user may be presented with the results in the appropriate format. This may be, for example, within a client aspect of the software application operating on the electronic device and facilitating operation of the present system and method. The application may include a graphical user interface (GUI), showing or representing the results in some format. In some embodiments, a user may be allowed to determine the way results are displayed to them. If only some results are shown to a user, application processing may be sped up. This, in turn, may lead to a better experience for a user. But not all embodiments require that the results be presented to a user, and in some cases, the results may be processed and consumed by the application.

Some rules may be applied at the remote device, and some at the electronic device. As an example, the remote device may filter certain results, while the order of display of results may be determined by rules set up by the user and stored on the user's electronic device. By way of example, an application operating on a user's electronic device may define a set of rules according to which results are to be presented to a user. The user's electronic device may transmit a request for multiple RNG results to an appropriate remote device, which may in turn generate and return the requested results. The results may be received in a specific order as per the set of rules communicated to the remote device associated with the RNG. The results may then be provided to the user in the order as specified.

Advantageously, the systems and methods disclosed herein allow a reduction in data usage, and an accompanying increase in communication speed. A lower number of requests, along with a single transmission of results, may contribute to such reduction in data usage and accompanying transfer speed. A re-ordering of data prior to its presentation to a user may add to a user's overall experience, in that a number of results may be presented in a continuously increasing order, a continuously decreasing manner, or an alternating manner, a combination manner, or the like. A set of rules may be chosen by a user or may be specified according to the preference of a provider of the application, with the goal of tailoring and improving a user's experience. Removing certain results from the results displayed to a user may reduce the data processed by the electronic device, speeding up a user's experience.

Another advantage of these embodiments is that the electronic device can continue using the received random numbers (e.g., displaying results to a user) even if the electronic device loses network connectivity with the remote device. For example, the electronic device may be a mobile device, and thus may lose network connectivity or may be subject to poor network connectivity from time to time.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" with a described list of at least two terms is to indicate any of the listed terms or any combination of the listed terms.

The use of ordinal numbers such as "first," "second," "third," and so on is to distinguish respective elements rather than to denote a particular order of those elements. For purpose of this description, the terms "multiple" and "a plurality of" refer to "two or more" or "more than one."

Additionally, a remote device may also be referred to as a "server device" or a "remote server device". An electronic device may also be referred to as a "client device" or a "user device".

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

II. Example Software Applications

An RNG component may employ one or more techniques for generating random numbers. Thus, the RNG component may be a pseudo-RNG that produces deterministic sequences of numbers that appear random or have statistical characteristics of random numbers. Example pseudo-RNGs could be based on a linear congruential expression or output of a cryptographic hash. On the other hand, the RNG component may be a true-RNG that determines non-deterministic sequences of random numbers from measurements of random physical phenomena. Examples of these physical phenomena include atmospheric noise, noise from hardware components (e.g., thermal noise from a resistor, breakdown noise from a Zener diode), radioactive decay, quantum fluctuations in a vacuum, etc.

For some software applications, true-RNGs may be favourable over pseudo-RNGs. In recent years, RNG hacking has occurred where attackers have reverse engineered a pseudo-RNG so that its algorithm and seed are known. Then the attacker can predict the next numbers that the pseudo-RNG will produce. As a consequence, true-RNGs may be employed to mitigate RNG hacking, but the measurements made by true-RNGs are often too compute intensive, too complicated, or otherwise not feasible to be integrated in client devices.

Thus, using a remote device for generating random numbers, where the remote device is disposed in a secured location that is distinct from that of the computing devices using the RNGS, is advantageous. The remote device can be protected by device level security (e.g., passwords, access control lists, and malware scanners) and network level security (e.g., firewalls, demilitarized zones (DMZs), as well as intrusion detection and prevention systems). The remote device can also be placed in a location with physical security, such as locked doors and guards. Some modern data centers are examples of locations with physical security.

RNG hacking may be harder to carry out on the remote device, as attackers are unlikely to be able to gain physical access to it. Further, the remote device can be connected to more complicated, custom hardware to measure the physical phenomena used as the basis of a true-RNG.

In one embodiment, the software application may employ the RNG for cryptography, e.g., encryption and decryption of messages or files. The software application may use results generated by the RNG to generate cryptographic keys and then use the results and the cryptographic keys to encrypt and/or decrypt messages and/or files.

Encryption may involve converting plaintext into ciphertext, which may be converted back to the plaintext through the use of one or more cryptographic keys. Many cryptographic techniques and algorithms are available, for example, Diffie-Hellman key exchange, the Cramer-Shoup system, the Rivest-Shamir-Adleman (RSA) algorithm, the Secure Hash Algorithm (SHA), the Advanced Encryption Standard (AES), and others. These encryption algorithms may be used for a variety of protocols and applications, such as Secure Socket Layer (SSL), Transport Layer Security (TLS), Secure Shell (SSH), Internet Protocol Security (IPSec), passwords, virtual provide networks (VPNs), and cryptocurrencies.

This encryption often involves the use of random numbers so that the encrypted message is non-deterministic, or at least difficult to decipher without the appropriate cryptographic key. Taking RSA encryption as an example, the results from the RNG may be used to identify two large random prime numbers, which may be used to generate the public and private cryptographic keys. For example, perhaps the remote device of the RNG stores a database of prime numbers and the results generated from the RNG are used to select two entries from this database of prime numbers. Alternatively, the remote device may probabilistically identify large prime numbers through use of the Rabin Miller primality test on the results from the RNG, for example.

The generated results from the RNG may be further used in optimal asymmetric encryption padding (OAEP) with RSA to introduce an element of randomness and avoid any potential deterministic property of RSA. For example, the RNG may generate many random numbers and the RNG-generated results may be expanded to a certain length before being exclusive ORed with the plain text message padded with zeros. This encoded message may then be encrypted with the RSA algorithm.

FIG. 1 depicts an example encryption system 10. The example encryption system 10 involves a remote device 12, which contains a RNG 14, a processor 16, and a database 18, in communication with a computing device 20, which contain software application 22. The processor 16 may be in communication with the RNG 14 and the database 18 to provide the functionality described above. For example, computing device 20 may implement the RSA algorithm using numbers generated by the remote device 12. Accordingly, the processor 16 may request two random prime numbers from the database 18 using numbers generated by the RNG 14, or alternatively, the processor may identify large prime numbers through using the Rabin Miller primality test. The processor 16 may additionally request from RNG 14 a list of random numbers to be used in OAEP with RSA. These generated random numbers may be transferred to the computing device 20 for use in the RSA algorithm (it may be assumed that there is already a secure encrypted connection between the remote device 12 and the computing device 20 so that these random numbers can be provided with limited risk of successful eavesdropping).

In a further embodiment, the software application may be involved in performing distributed simulations for large scale models and systems. The software application may send an instruction requesting one or more random numbers to an RNG of a remote device and then receive the requested random numbers. Subsequently, the software application may forward the results to one or more computers connected through a common network, and each computer may use the generated random numbers to generate results for the distributed simulation. Alternatively, the results could all be used on the same computer.

Distributed simulations may use random sampling for calculations to predict the outcomes of events, e.g., Monte Carlo methods. Because of the large amount of random sampling needed to determine outcomes, these simulations may be computationally expensive and unfeasible to run on a single computing device. Instead, the simulations may be deployed on a range of computing platforms connected through a network with each device receiving a set of numbers. Alternatively, the results may be used by multiple processors of a single computing device.

For example, random numbers may be requested five times to be used across five different computing devices. The requests may contain instructions to modifying the random values, as stated above. For example, the request may ask for a Normal (Gaussian) distribution of numbers from −100 to 100, and the RNG may respond with results between −100 and 100 with a Normal distribution. In alternative examples, the RNG may distribute the results to each of the computing devices on the network. For example, each computing device may query the RNG for random numbers for a specific simulation and these computing devices may be sent the random numbers directly by the RNG.

Figure 2:
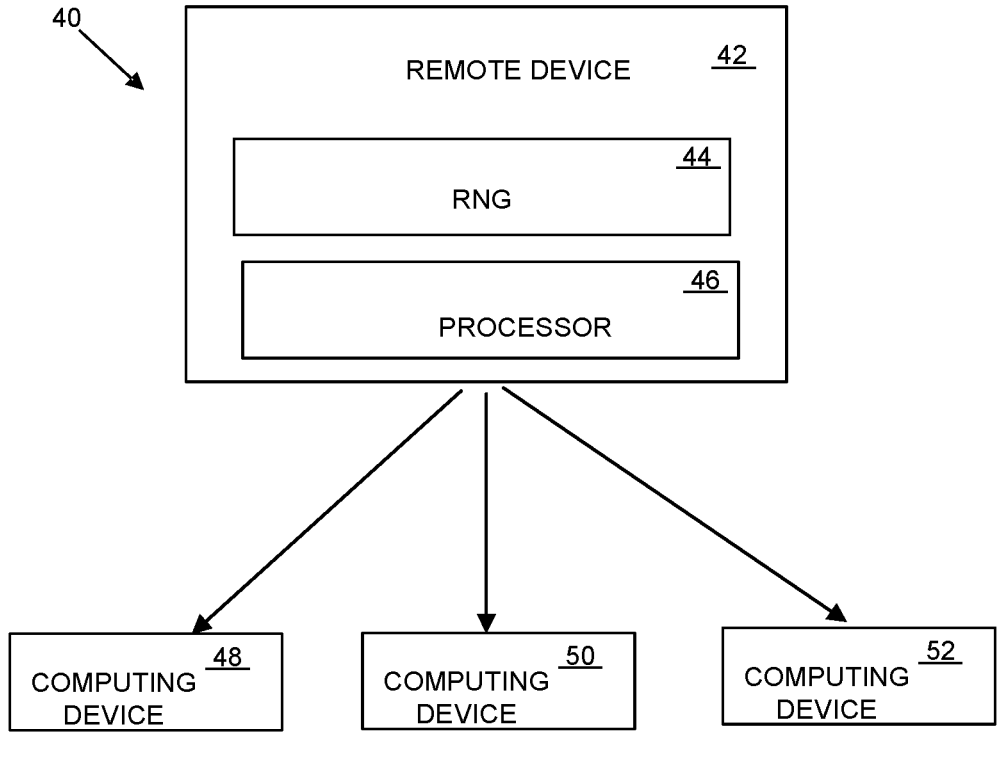
FIG. 2 is a simplified block diagram of a distributed simulation system in accordance with example embodiments.

FIG. 2 depicts an example implementation of such a distributed simulation system 40. The distributed simulation system 40 includes a remote device 42 in communication with computing devices 48, 50, and 52. Each of the computing devices 48, 50, and 52 may request random numbers for a certain simulation from remote device 42. For example, perhaps computing device 48 and computing device 50 are running similar simulations. Processor 46 may receive random numbers from the RNG 44, process them as necessary, and distribute them to computing devices 48 and 50. Upon completion of the simulation, processor 46 may receive the results and deduce aggregate results. Additionally, computing device 52 may run a different simulation from computing devices 48 and 50 and may accordingly receive comparatively different results than computing devices 48 and 50.

Because of the large amount of randomly generated numbers typically needed for these simulations to converge, it may be especially efficient for the results to be transferred as part of a single message, in a single transfer event. For example, the speed in which a single request can be completed could be much less than when multiple requests with several different random number responses are used.

In employing a remote RNG, the centralized software application may control the spread of the data, such that the distribution of data for each simulation or the simulation as a whole is not skewed in any particular and undesirable direction. A list of random numbers with a skewed distribution (e.g., positive skew toward the higher tail or negative skew toward the lower tail) could have a affect the accuracy of the simulation and the time the simulation takes to converge, which, depending on the application and field of the simulation, could have unintended and undesirable consequences. For example, a simple simulation could be used to estimate the value of pi, and if the distribution of random points is not uniform, an inaccurate value of pi could be estimated.

In another embodiment, the software application may employ the RNG for initiating random weight distributions of neural networks (e.g., convolutional neural networks, recurrent neural networks, shallow neural networks, dense neural networks, graph neural networks, etc.) to be run on a distributed network of computers. The software application may send requested results to one or more computers connected through a common network, and each computer may use the generated random numbers for initial weight distributions in neural networks associated with the same machine learning model.

In recent years, due to the large amount of data available and due to advances in technology, training neural networks and predicting outcomes using trained neural networks has become increasingly computationally intensive, with models having millions or even billions of tuneable parameters. However, these computationally expensive tasks may be difficult for a single computing device to perform efficiently and in a reasonable span of time. Accordingly, these computationally expensive tasks may be distributed across one or more computing devices in a distributed network.

To train neural networks, the initial weight distributions of each parameter in the neural network may be initialized to a random value and the distribution of random values may have an effect on the training time and accuracy of the neural network.

Figure 3:
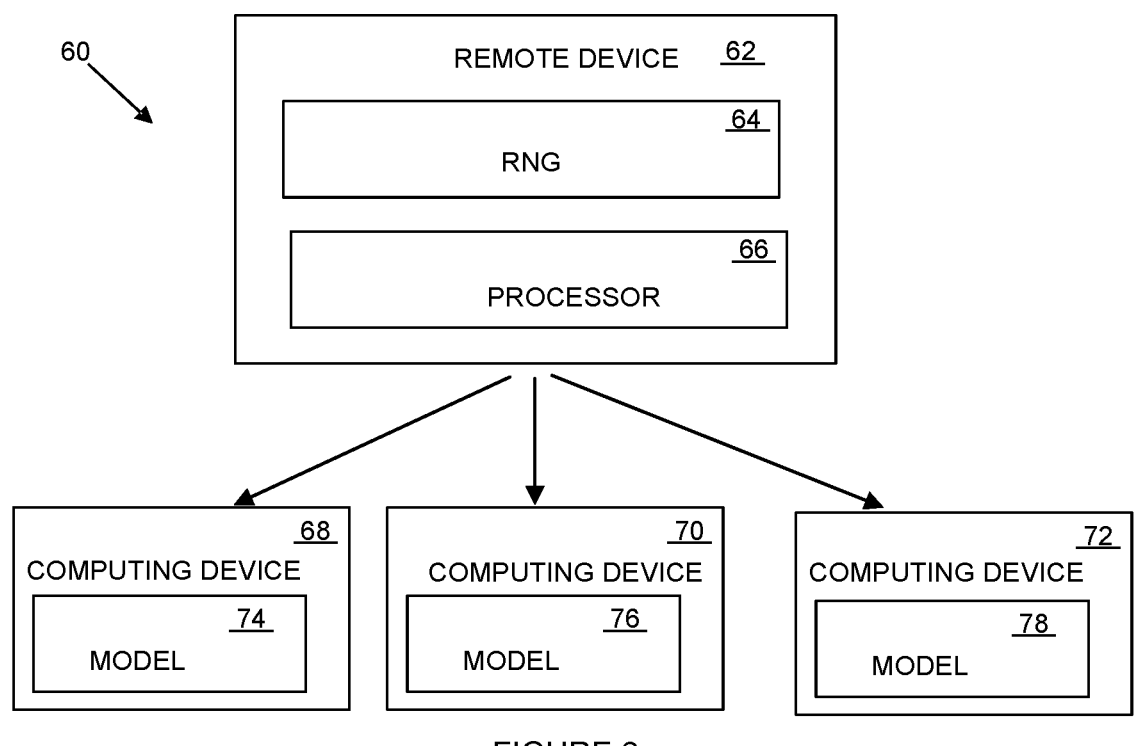
FIG. 3 is a simplified block diagram of a distributed machine learning system in accordance with example embodiments.

FIG. 3 depicts an example implementation of a distributed machine learning system 60. The distributed machine learning system 60 involves remote device 62 in communication with computing devices 68, 70, and 72. The remote device 62 may include an RNG 64 and a processor 66, and each of the computing devices 68, 70, and 72 may include neural network models, as in model 74, model 76, and model 78. The computing devices 68, 70, and 72 may receive random numbers from remote device 62 to be used in one or more parts of these neural network models.

In a further embodiment, the software application may be used to generate user passwords and the RNG may be employed so that random alphanumeric values may be generated. These alphanumeric values may be combined to form a user password. In some cases, these random alphanumeric values may be numbers, symbols, letters, and/or words, which may be concatenated to form a password of a desirable length.

For example, a user may request a generated password with at least 25 alphanumeric characters. The software application may receive the request and determine that the words stored in a list of words average about five characters in length. Accordingly, the software application may then use the RNG to generate five or more random numbers and use these to select words from the list. These words could then be concatenated with each other so that a password of 25 alphanumeric characters is obtained. Alternatively or additionally, each character of the password may be generated individually.

Figure 4:
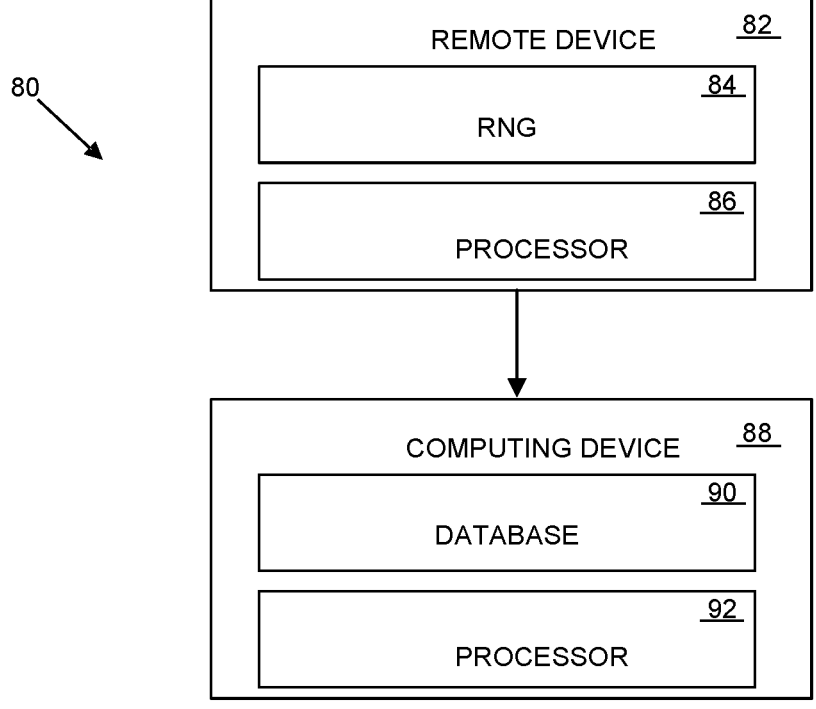
FIG. 4 is a simplified block diagram of a password generation system in accordance with example embodiments.

FIG. 4 depicts an example implementation of a password generation system 80. Password generation system 80 may involve remote device 82 in communication with computing device 88. Remote device 82 may include RNG 84 and processor 86, and computing device 88 may include database 90 and processor 92. The computing device 88 may receive results from the remote device 82 and the processor 92 may use the generated results to select alphanumeric values (e.g., letters or words) stored in the database 90.

In a further embodiment, the software application may be a wagering game, such as a reel-based game. The set of rules may apply to any one of more of a base game, bonus game, or free game play of the wagering game, and may be communicated to the remote device associated with the RNG. The software application may initiate gameplay, either as part of base game play and in response to user instruction, or as part of a bonus game or free game session activated during gameplay.

While the embodiments herein apply to numerous types of software applications, the following sections focus on the wagering game example. Nonetheless, the advantages of these examples can be applied to any type of software application that involves a remote device that uses an RNG to provide randomly-selected outcome events to an electronic device.

III. Example Architecture

Figure 5:
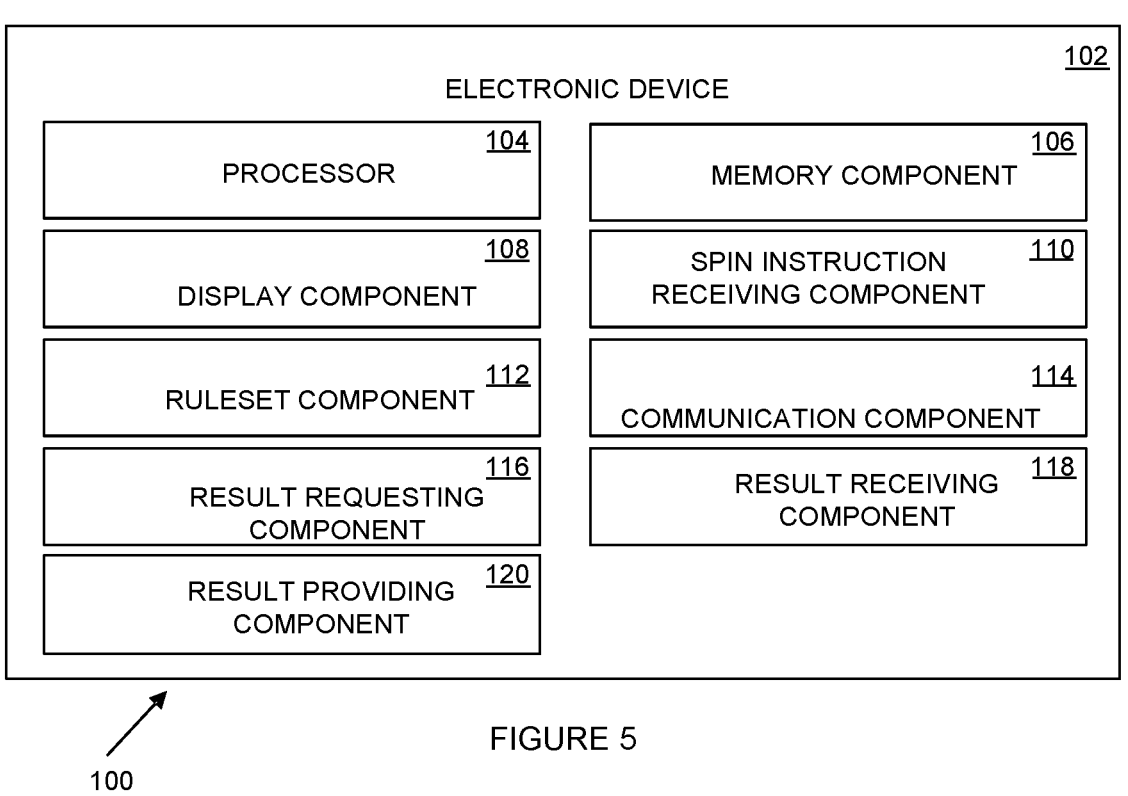
FIG. 5 is a simplified block diagram of an electronic device in accordance with example embodiments.

FIG. 5 is a block diagram 100 depicting an electronic device 102 arranged to implement operations in accordance with example embodiments described herein. The electronic device 102 may take any of a variety of forms, including for example a dedicated machine, a personal computer, a server computer, a personal digital assistant, a mobile phone, a tablet device, or some other computing device.

In gaming machine embodiments, the electronic device may provide a reel-type slot machine with five reels, with each reel including a plurality of symbols.

The electronic device 102 may be arranged to implement any of the methods or software applications as described herein. The electronic device 102 may include a processor 104 arranged to execute the functions of various components, which may be provided by hardware or by software units executing on the electronic device 102. The software units may be stored in a memory component 106, and instructions may be provided to the processor 104 to carry out the functionality of the described components. The various components can include a display component 108, a spin instruction receiving component 110, a ruleset component 112, a communication component 114, a result requesting component 116, a result receiving component 118, and a result providing component 120.

The display component 108 may be arranged to provide a display area that may include a matrix of symbols and/or a GUI which may be used by a user to interact with the electronic device 102. Columns of the matrix may represent reels of a gaming machine. The display area and GUI may be provided on a display associated with the gaming machine 102.

The spin instruction receiving component 110 may be arranged to receive a spin instruction from a user. A spin instruction may have a wager associated therewith, which the user may be allowed to adjust as desired. A spin instruction may include an indication of how many spins (or, how many iterations of the game) a user wishes the current systems and methods to process at once. This is further explained below.

The ruleset component 112 may be arranged to store a set of rules relating to the management of a set of more than one iteration of the game, or more than one spin, initiated at the same time. The user may be allowed to set up rules, or the game itself may specify the set of rules. Rules may be transmitted to a remote device for implementation, or may be implemented on the electronic device 102 itself. As an example, a user may set up a rule that specifies that results of the multiple requested game iterations are provided back to them in an ascending order, i.e. that the smallest win from the multiple results are provided to them first, with subsequent result being provided in an ascending order so that the largest win is presented to them last. Results may be ordered and on the electronic device itself, or the rule may be provided to the remote device, and it may be implemented there. When provided to the remote device, the electronic device may receive results in the correct order and there may be presented to the user without any further manipulation thereof.

The communication component 114 may be arranged to communicate with a remote device associated with the electronic device and/or the game being played thereon. Communication may include the transmission of rules and requests for data or results, and the receipt of results or data back from the remote device. This communication may take place over a local area network (wired or wireless) or a wide area network (e.g., the Internet).

The result requesting component 116 may be arranged to request, from the remote device, an appropriate number of results to be calculated by an RNG associated with the remote device. The result receiving component 118 may be arranged to receive, from the remote device, the number of requested results back from the remote device. The results may already be ordered according to rules presented to or stored at the remote device, or may be re-ordered and/or further modified at the electronic device 102 according to rules in the ruleset component 112.

The result providing component 120 may be arranged to provide the re-ordered and/or modified results to the user, typically via the display component in a visual format.

Figure 6:
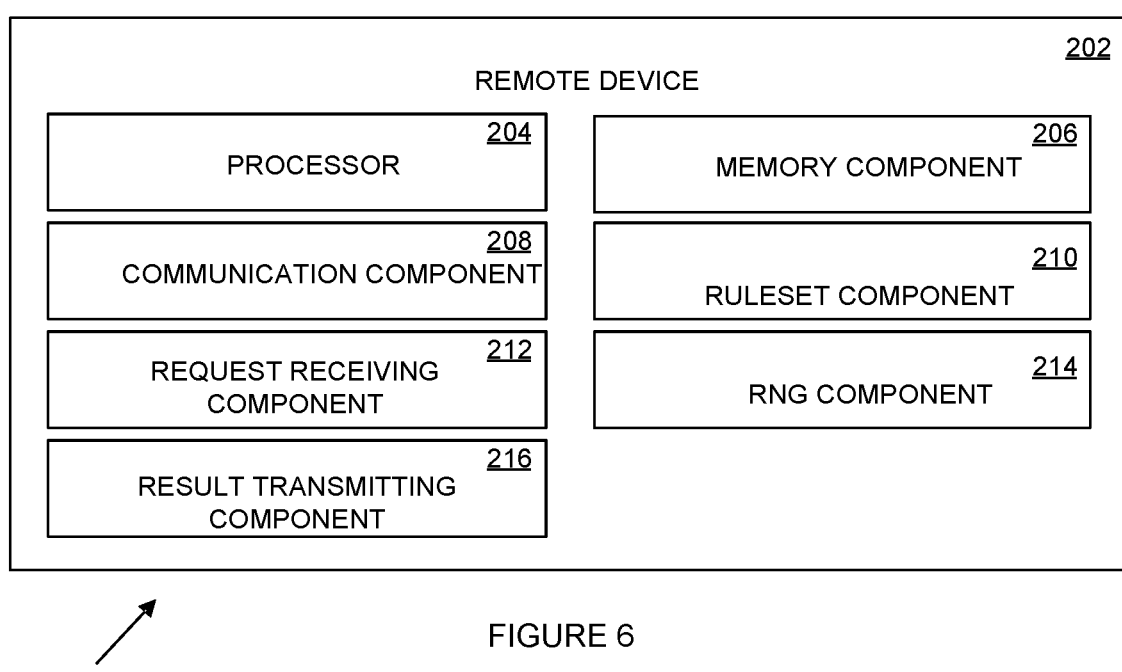
FIG. 6 is a simplified block diagram of a remote device in accordance with example embodiments.

FIG. 6 is a block diagram 200 depicting a remote device 202 arranged to implement operations in accordance with example embodiments described herein. The remote device 202 may take any of a variety of forms, including a physical remote server, a virtual server, a local server (e.g., on the same local area network or segment), a cloud server, or the like.

The remote device 202 may be arranged to implement the remote device methods as described herein. The remote device 202 include a processor 204 arranged to execute the functions of various components, which may be provided by hardware or by software units executing on the remote device 202. The software units may be stored in a memory component 206, and instructions may be provided to the processor 204 to carry out the functionality of the described components. The various components can include a communication component 208, a ruleset component 210, a request receiving component 212, an RNG component 214, and a result transmitting component 216.

The communication component 208 may be arranged to facilitate communication between the remote device 202 and the electronic device 102. It will be apparent that, in practice, many electronic devices similar to the one shown in FIG. 5 may be in simultaneous data communication with the remote device 202.

The ruleset component 210 may be arranged to store a set of rules relating to how data of calculated results are to be modified (e.g., ordered and/or filtered) prior to being transmitted to the electronic device 102. The ruleset component 210 need not form part of the remote device 202 if the electronic device 102 has a suitable ruleset component. In some embodiments, some rules may be implemented by the ruleset component 210 of the remote device 202, and some rules by the ruleset component 112 of the electronic device 102. A set of rules in the ruleset component 210 may be configured or hard-coded for a particular software application or game, or may be received from the electronic device for a specific software application or game.

The request receiving component 212 may be arranged to receive a request for one or more results from the electronic device 102. The request may seek randomly generated results.

The RNG component 214 may be arranged to generate the requested results. As noted above, the RNG component 214 may be a true-RNG or a pseudo-RNG.

The result transmitting component 216 may be arranged to transmit the results generated by the RNG component 214 back to the electronic device 102. If the ruleset component 210 forms part of the remote device 202, the results may be re-ordered and/or filtered prior to being transmitted to the electronic device 102.

IV. Example Operations

Figure 7:
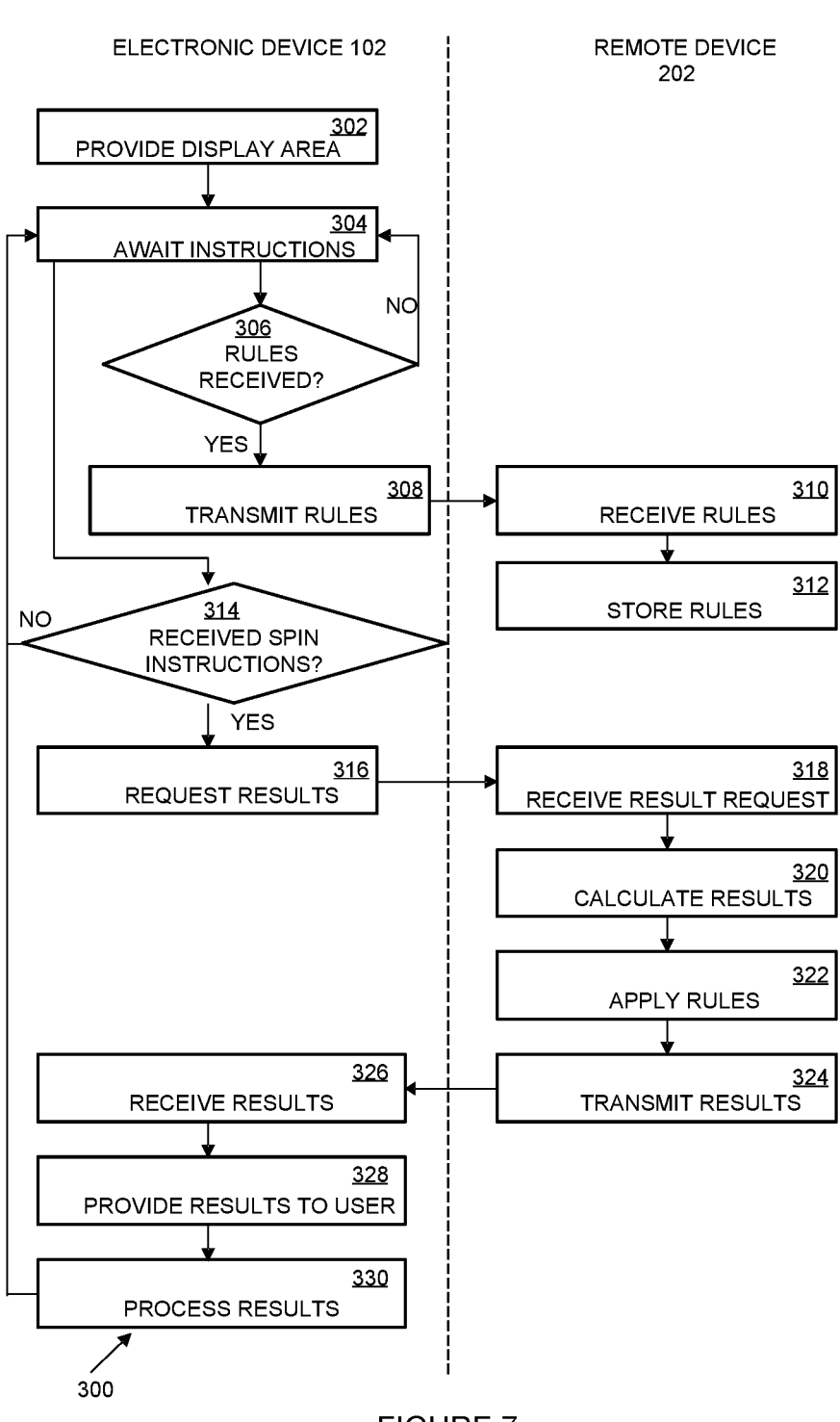
FIG. 7 is a first flow diagram in accordance with example embodiments.

FIG. 7 depicts a swim-lane flow diagram 300 that illustrates an example method that may be carried out using an electronic device, such as the electronic device 102 of FIG. 5, and a server, such as the remote device 202 of FIG. 6. Operations of the method are shown within blocks 302 to 330. The example method can relate to performing outcome events, such as wager games. Any operation described below, or elsewhere in this description, with respect to FIG. 7, can be performed, at least in part, by a processor, such as the processor 104 or processor 204 executing software program instructions. In the embodiment detailed by the present flow diagram 300, a set of rules may be defined by a user themselves, with the set then being provided to the remote device 202 associated with the RNG responsible for calculating game results. The remote device 202 may then apply the defined rules, and provide the user with a playing experience at least partially configured by themselves. The user may specify the number of results to be processed in a single session, and the remote device 202 may facilitate the processing of the defined number of results and provide the results back for display to the user.

Block 302 includes providing, by the electronic device 102, a display area. In a slot-based wager game environment, the display area may include a matrix of symbols that includes at least one row and one column. In an example embodiment, it may have three rows and five columns. Each column may simulate a reel of a physical gaming machine. Block 304 includes the electronic device 102, awaiting for user provided instructions, possibly a multispin spinning instruction that causes spinning of the reels to occur several times, or an instruction for the creation or modification of rules defining how results of gameplay should be managed.

If rules are received in block 306, the rules may be transmitted to the remote device 202 at block 308. The remote device 202 may receive the rules in block 310, and store the rules in block 312. These rules would then be used when game results are processed by the remote device 202 for electronic device 102 and/or its current user. If rules are not received in block 306, further instructions may be awaited at block 304. After the rules have been transmitted in block 308, the electronic device 102 may await further instructions at block 304.

It should, however, be noted that rules relating to gameplay may be defined by the user and stored on the electronic device 102 itself, or may be determined by a developer or provider of the game and may be specified at the remote device 202 or the electronic device 102 without user interaction. In such embodiments, the game rules may be changed by the provided or creator of the game when applicable. Then, blocks 306 to 312 may not be required. This is further explained below.

If a spin instruction is received by the electronic device 102 in block 314, a number of results corresponding to the number specified as part of the spin instruction is requested from the remote device 202 in block 316. If a spin instruction is not received in block 314, further instructions may be awaited at block 304.

Block 318 includes receiving, by the remote device 202, the request for results from the electronic device 102. As specified above, the request is for a number of results as specified by the user upon providing the spin instruction.

Block 320 includes calculating the number of results, as requested. This may include generating an appropriate number of random results using an RNG. When all of the results have been calculated or generated, block 322 includes applying the rules stored on the remote device 202. An example of rules may be that results are ordered in a smallest to largest benefit for the user, for example from a smallest return to the largest return, and that results without any benefit to the user, for example non-winning results, are discarded and not provided to the user. If rules are not modifiable by a user, rules stored in memory may be applied, possibly as set up by a developer or operator of the game.

Block 324 then includes the remote device 202 transmitting the remaining results, in the new order, back to the electronic device.

Block 326 includes the electronic device 102 receiving the results from the remote device 202.

Block 328 then includes providing the results to the user, typically via the display area on which the user may view gameplay. The results may be provided in any suitable format, whether in the form of rotating reels landing in the appropriate positions, in monetary or numerical format only, or the like. Thus, the results may be used to drive a graphical simulation of spinning reels, for example.

Block 330 then includes processing the results, which may include updating a balance of a user's wallet or account, as appropriate. Then, the method may return to block 304, where further instructions are awaited. In some embodiments, this processing of the results may take place on the remote device 202 instead.

Any of the blocks of a flow diagram or a component in a block diagram may be provided by hardware or by software associated with the specific device, whether the electronic device 102 or the remote device 202. These devices may be embodied by a personal computer, laptop computer, personal digital assistant, smartphone, feature phone, satellite phone, server computer, phablet, tablet, wearable computer, or the like. Appropriate components may form part of such a device for the operation of the required method on that device. Further, the devices may be configured to communicate wirelessly or over a wired communication network. The various components forming part of each device may be configured to communicate with each other via an appropriate communication interface, while an appropriate external communication interface may facilitate communication with other devices, whether forming part of the present systems or not.

Notably, the feature of a single request for multiple results, transmitted from the electronic device 102 to the remote device 202 may reduce the total amount of data required to request a total number of desired results when compared to individual intermittent requests. Transferring all results in a single message back to the electronic device 102 may further reduce overall data usage. The re-organising of results according to user or creator preference may further improve a user's experience, and by removing some of the results from the set of results to be provided to a user, the amount of data used to transmit results from the remote device 202 to the electronic device 102 may be further reduced and/or the time to provide a user with all results may be reduced. The reduction in data usage may also reduce the time required to request and transmit the required number of results between the electronic device 102 and the remote device 202.

In addition, once a user device has successfully received the requested number of results, a user's experience may be guarded from connectivity and connection difficulties, for example when communication signals may be lost or of low quality. This may allow a user to experience gameplay when connectivity is lost or is of inferior quality. Thus, for example, when electronic device 102 is a mobile phone or tablet that is going in and out of wireless coverage, gameplay can continue even in view of these connectivity problems.

In some embodiments, rules may also be stored on the electronic device 102. Then, block 308 and block 310 may not be required, and block 312 (store rules) may be performed on the electronic device 102 instead. Rules may then be applied at the electronic device 102 after results are received from the remote device, as at block 326. In some embodiments, rules may be stored and applied at both the electronic device 102 and the remote device 202, and appropriate adjustments may be made to the flow diagram 300.

FIGS. 8 to 9 and 12 to 20 depict screen shots of a display 400 of an electronic device including a GUI on which a game, according to example embodiments, may be played. This example embodiment is an implementation where rules are executed by the remote device 202, and the electronic device 102 receives a re-ordered set of results after the rules have been applied at the remote device 202. In some embodiments, any non-winning results need not be transmitted from the remote device 202 to the electronic device 102.

A user may be presented with a display that includes a GUI via which the user may play a game. A user may be allowed to set up rules for gameplay. After configuration by the user, rules may be transmitted to a remote device 202 facilitating operation of the game. The remote device 202 may then apply the rules when appropriate, as explained above with reference to FIG. 7.

Figure 8:
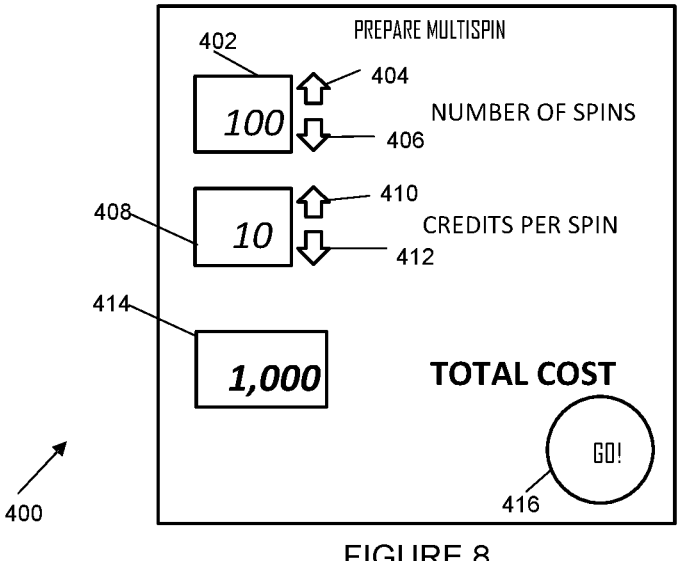
FIG. 8 is a first screenshot of a display screen in accordance with example embodiments.

FIG. 8 shows the display 400 when a user wishes to initiate several spins whilst utilizing the rules he or she has set up. As example, the selection by a user to set up such a spin may show a menu heading as per the current display, namely "Prepare Multispin". A user may be allowed to set a number of spins they wish to initiate by adjusting a value shown in a first box 402. A desired number may be manually entered in the first box 402 or may be adjusted by adjacent adjustment arrows 404 and 406. Selection of the adjustment arrows may increase or decrease the number of spins by a single value at a time or by a set number, for example five or ten.

A second box 408 is also provided. This second box 408 allows the credits that a user wagers per each of the selected number of spins to be adjusted. Again, a user may manually enter a value in the second box 408, or may adjust the value with adjacent adjustment arrows 410 and 412. The value allowed per wager may be limited to a specific range, for example between a minimum and a maximum value.

A third box 414 shows a total cost that a user may incur if they were to proceed with currently selected values for the number of spins and the cost per spin. This is simply the value of each spin, multiplied by the number of spins. The first box 402 shows 100 spins are selected, and the second box shows a value of 10 credits are selected per spin. Accordingly, the total cost shown in the third box 414 is 1,000 credits.

A button 416 is marked "GO!", and selection thereof will initiate the multiple spins according to the selected criteria and at the cost shown. It will be apparent that in order to initiate the spins at the chosen total cost, a user may require a balance of at least the same amount in a wallet or account associated with the game or provider of the game and which can be accessed to pay for the multiple spins. Selecting the button 416 may initiate a process wherein the operator of the game takes the total cost shown from a user's account prior to initiating calculations and play of the total number of spins.

Figure 9:
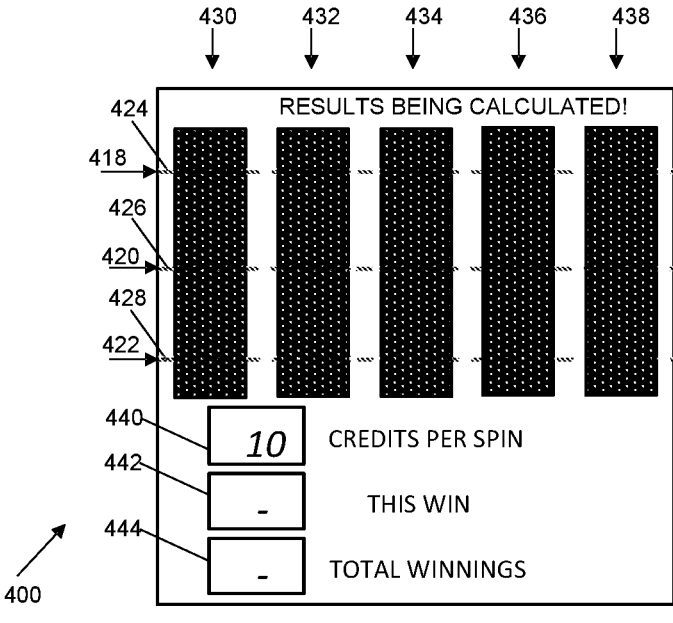
FIG. 9 is a second screenshot of a display screen in accordance with example embodiments.

Moving then to FIG. 9, a user is shown spinning reels. The example game of the present embodiment may be referred to as a "five-reel" slot game having three pay lines. A matrix of symbols is provided on the display when the reels are not spinning. Three rows are provided in the matrix, as well as five columns. A pay line is provided on each of the three rows of the matrix. The three rows are numbered 418, 420 and 422, and pay lines 424, 426 and 428 are associated with rows 418, 420 and 422, respectively.

The first column is indicated by numeral 430, the second by numeral 432, the third by numeral 434, the fourth by numeral 436, and the fifth by numeral 438. To simplify the disclosure, only four different basic symbols are provided on the reels, notably Jacks (depicted by a "J"), Queens (depicted by a "Q"), Kings (depicted by a "K"), and Aces (depicted by a "A"). It will be apparent that many different types of symbols may be provided in other embodiments.

A message is provided at the top of the display 400 in FIG. 9, showing "Results being calculated". At this time, the instruction to prepare multiple spins has been sent to a remote device 202 associated with an RNG. The results of 100 spins, as selected by the user, may now be calculated in the background, by the RNG at the remote device 202.

A credit box 440 reminds a user of the cost per spin as selected. A current win box 442 shows a win provided by a specific result shows on the display, and a total winnings box 444 provides a running total of the winnings collected whilst the series of 100 spins are being played out to the user. This is further detailed below.

Figures 10, 11:
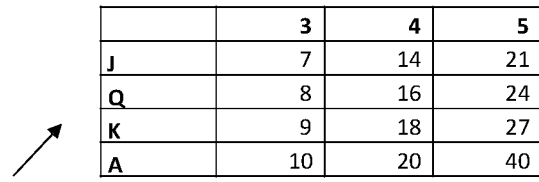
FIG. 10 is a pay table in accordance with example embodiments.
FIG. 11 is a table of results in accordance with example embodiments.

FIG. 10 shows pay table 450 that may be associated with the present example embodiment. The pay table 450 is deliberately configured in a simple manner, purely for example purposes. It will be apparent that pay tables may be much more complex. The return for a specified number of symbols landing on a single pay line, from left to right, for each of a Jack, Queen, King and Ace is shown. The return reflects the return based on a wager of 10 credits, as selected above in FIG. 8. Three Jacks provides a return of seven credits, three Queens eight credits, three Kings nine credits, and three Aces ten credits. Four Jacks provides fourteen credits, four Queens sixteen credits, four Kings eighteen credits, and four Aces twenty credits. Five Jacks provides twenty-one credits, five Queens twenty-four credits, five Kings twenty-seven credits, and five Aces forty credits. Any combination across more than one pay line will provide the sum of the two as return, for example four Aces and three Kings will provide a return of twenty-nine credits.

Turning now to FIG. 11, a results table 460 is shown, which is an example result of all 100 spins after application of the appropriate rules. The set of rules for the present embodiment are that results are to be shown to a user in incrementing order, but any zero-return should not be shown. The results table 460 shows the results ordered from highest return to lowest return, and should be presented to a user in reverse order. It should be noted that the lowest 66 spins all had no value, and need not be shown to a user. As a result, 66 fewer results need to be transmitted form the remote device 202 to the electronic device 102 on which the display 400 is provided. All remaining results will be zero.

The electronic device 102 may assume that when it requests n results and receives only m<n results, the missing n-m results have a zero value or otherwise do not need to be displayed. Prior to being shown the symbols as they land after spinning in FIG. 9, the user may be presented with information indicating the number of spins that have not led to a result, i.e. all the spins that led to no return or winnings for the user.

Figures 12, 13:
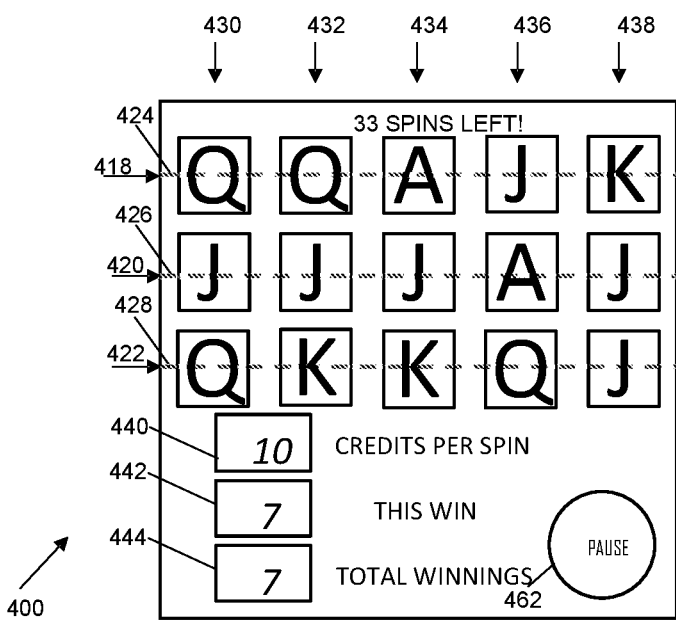
FIG. 12 is a third screenshot of a display screen in accordance with example embodiments.
FIG. 13 is a fourth screenshot of a display screen in accordance with example embodiments.

Turning then to FIG. 12, a user may be presented with the first result, number 34 in the results table 460. The matrix of symbols may be displayed to the user as if the spinning reels, shown in FIG. 9, have landed in the positions as determined by the RNG. In some cases, electronic device 102 may visually simulate the spinning of the reels on a GUI. Three Jacks have landed on the second row 420 and on the second pay line 426, starting from the first column 430. This corresponds to a return or win of seven credits in the pay table of FIG. 10.

The current win box 442 may show the value of the current result, being seven credits. The total winnings box 444 may be updated to show seven credits as well. It should be noted that a pause button 462 is provided in the current display. This may be selected by the user if they wish to pause or interrupt the playback of results. The number of remaining spins is shown towards the top of the display as 33, with the currently displayed result being number 34 in the results table.

Moving then to FIG. 13, the display may, after a short time showing the result of FIG. 12, automatically show reels spinning, similar to the view shown in FIG. 9. This serves to transition to a next result in the results table. The credit box 440 still shows the cost of the current spin, and the total winnings box 444 still shows the running total of wins for the series of spins. The current win box 442 is cleared as the user awaits display of the next result. While the reels are shown to be spinning, the number of remaining spins is updated to 32, as the $33^{rd}$ spin is underway.

Figure 14:
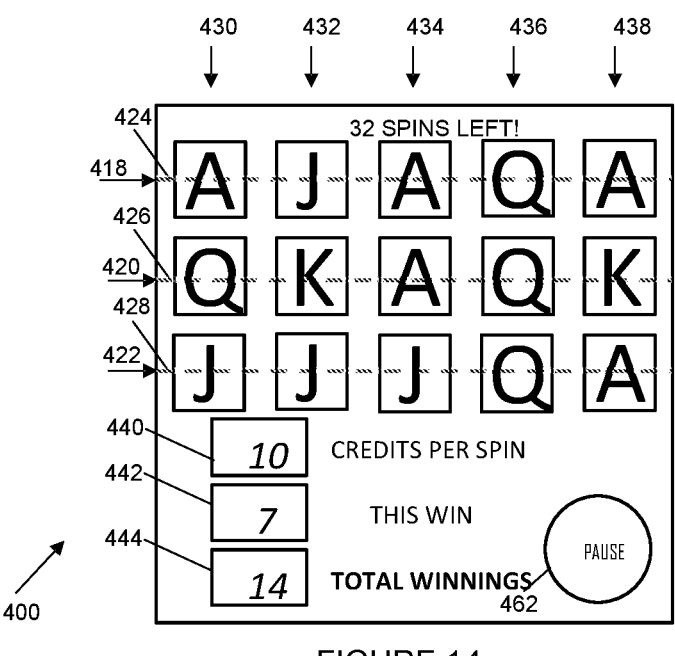
FIG. 14 is a fifth screenshot of a display screen in accordance with example embodiments.

As the reels stop spinning, symbols come to rest in the matrix according to the next determined result in the results table, currently result number 33. This result is shown in FIG. 14. Again, three Jacks have landed, but now on the third pay line 428 and third row of symbols. Again, the current win box 442 shows 7 credits have been won by the current result. The total winnings box 444 now shows the running total of the first two results, being fourteen total credits won.

Figure 15:
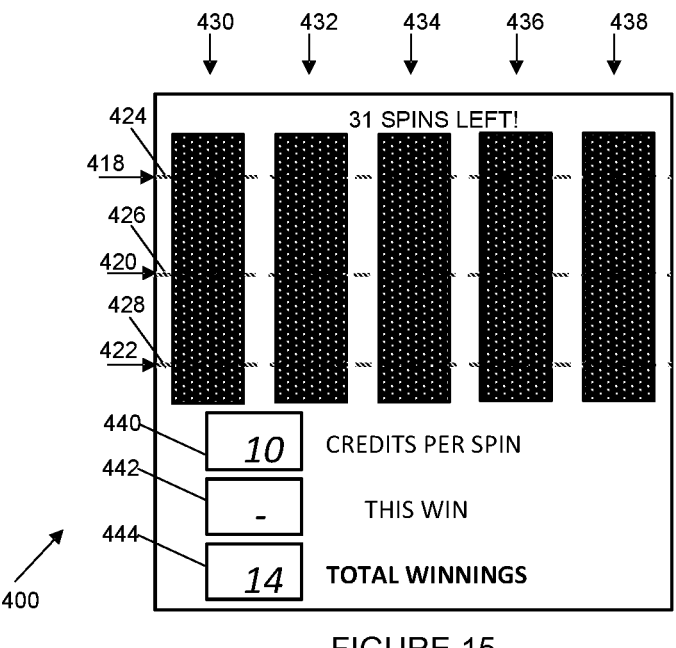
FIG. 15 is a sixth screenshot of a display screen in accordance with example embodiments.

Moving then to FIG. 15, the display may automatically, after a short time, spin the reels again. The number of spins remaining is updated to 31, as the $32^{nd}$ spin is underway. This process of showing spinning reels, and showing a result with the symbols landing as determined by the RNG and according to the results table, may repeat for the remainder of the results table.

Figures 16, 17:
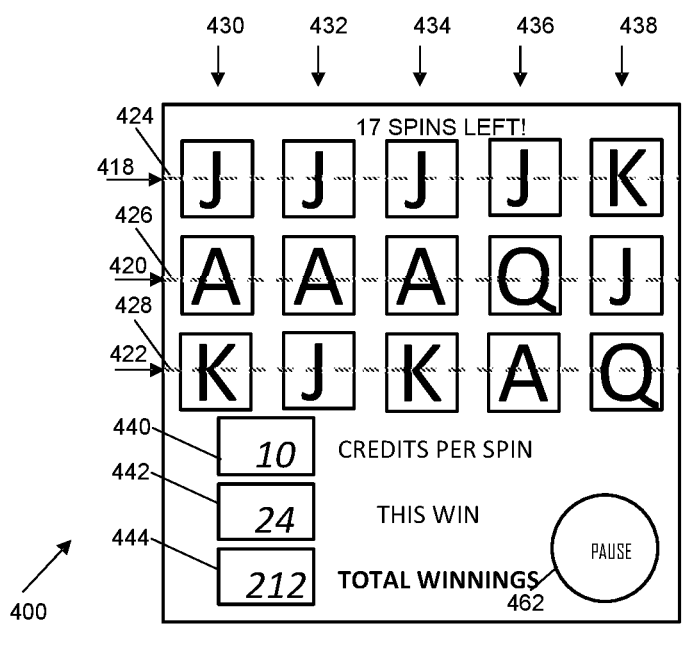
FIG. 16 is a seventh screenshot of a display screen in accordance with example embodiments.
FIG. 17 is an eighth screenshot of a display screen in accordance with example embodiments.

FIG. 16 shows the symbols according to result number 18 in the results table 460. Four Jacks have landed on the first pay line 424, and three Aces have landed on the second pay line 426. According to the pay table 450 of FIG. 10, this provides a win of 24 credits. This is reflected in the current win box 442. The total winnings box 444 shows a total winnings of 212 credits. 17 spins are shown to be remaining.

Moving then to FIG. 17, the reels may again spin as previously described with reference to FIGS. 9, 13, and 15. The number of spins remaining is also updated.

Figure 18:
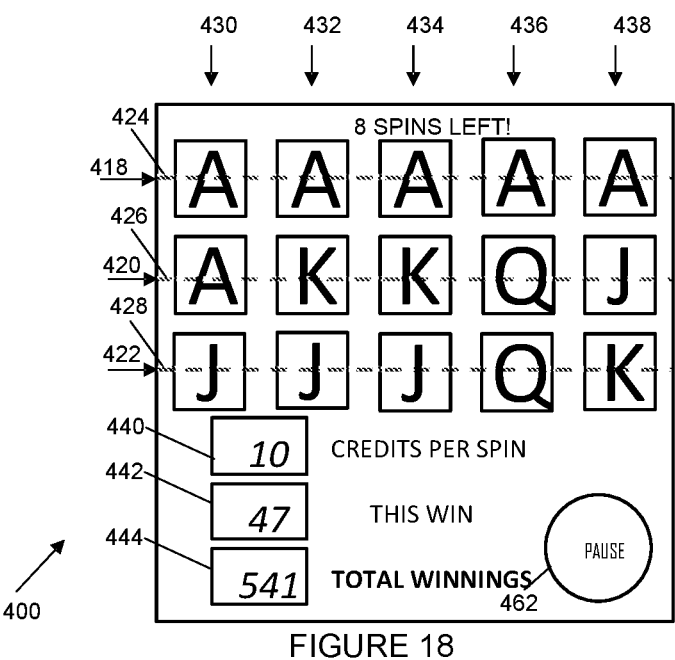
FIG. 18 is a ninth screenshot of a display screen in accordance with example embodiments.
Figure 19:
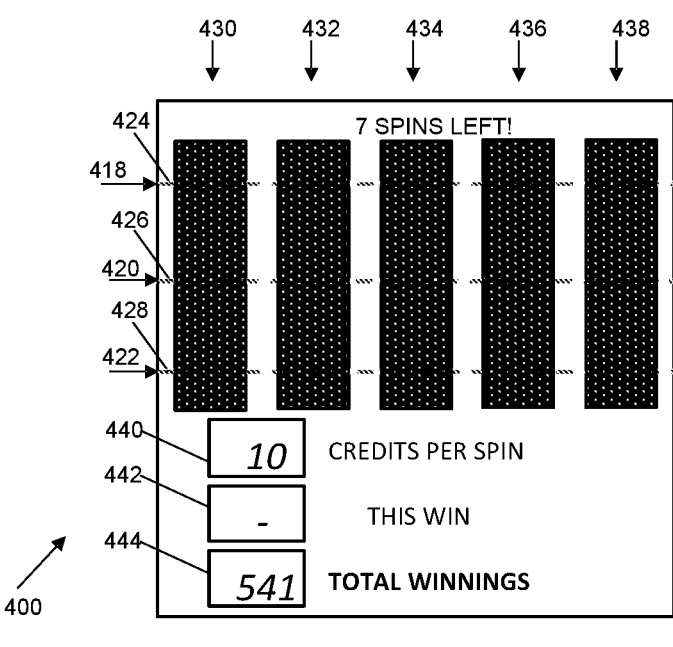
FIG. 19 is a tenth screenshot of a display screen in accordance with example embodiments.

FIG. 18 shows the symbols according to result number 9 in the results table 460. Five Aces have landed on the first pay line 424, and three Jacks have landed on the third pay line 428. According to the pay table 450 of FIG. 10, this provides a win of 47 credits. This is reflected in the current win box 442. The total winnings box 444 shows a total winnings of 541 credits. Eight spins are shown to be remaining.

Moving then to FIG. 19, the reels may again spin as previously described with reference to FIGS. 9, 13, 15, and 17. The number of spins remaining is also updated.

Figure 20:
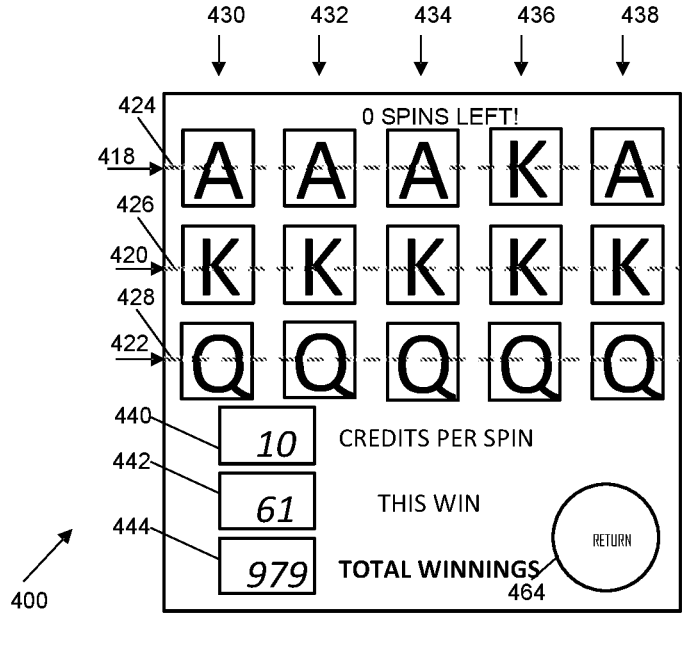
FIG. 20 is an eleventh screenshot of a display screen in accordance with example embodiments.

FIG. 20 shows the final result, number one in the results table 460 of FIG. 11, when no spins remain. Three Aces have landed on the first pay line 424, five Kings on the second pay line 426, and five Queens on the third pay line 428. According to the pay table 450 of FIG. 10, this provides a return or win of 61 credits. This is also shown in the current win box 442. The total winnings box has been updated to a final total of 979 credits. For the 1000 credits wagered in total, the user has received 979 credits back. The Pause button 462 has now changed to a return button 464 and selection thereof may allow the user to return to a main menu, where they may initiate another play of the game, similar to the one described above.

The ability to request multiple results at one time may reduce the data transmitted between the electronic device 102 and the remote device 202 processing such requests. This may speed up transmission time for all requested data. The transmission of multiple results from the remote device 202 back to the user's electronic device in a single message (or at least a small number of messages) may reduce the overall data to be transmitted, and may reduce the overall time required for transmitting and receiving all the results.

The functionality of re-arranging the results of a number of results purchased by a user may provide an improved playing experience to a user, given that anticipation may build over multiple spins, as the user anticipates and is guaranteed an increasing win, at least with the rules of the current embodiment. Once non-winning results have been either viewed or skipped, a player may be provided with ever-growing winning spins as the remaining spins are played back to them. In non-gaming embodiments, re-arranging of results may involve sorting or randomizing the order of the results. For example, the sorted results may facilitate visually validating the results for a certain distribution, e.g., a Normal distribution or a uniform distribution such that histograms or other charts can be generated in a more straight-forward way. And as mentioned above, these distributions may have an effect on the final results that are generated, for example in distributed simulations and distributed neural networks. Additionally, randomizing the order of the results may facilitate non-deterministic results from the RNG, which may improve security and improve results for simulations and models being executed in distributed systems.

In addition to increasing efficiency, the removal of non-winning results may remove a feeling of disappointment during the display of such results, and may improve a user's experience. In non-gaming embodiments, the electronic device 102 may be configured to specify how certain results are to be removed or not removed. For example, the electronic device 102 may instruct the remote device 202 to generate 100 floating point random numbers between 0.0 and 1.0, but omit any results that are less and 0.2. This example assumes that results that are less and 0.2 are not usable by the software application requesting the results. In other examples, the electronic device 102 may instruct the remote device to generate 100 floating point random numbers between 0.0 and 1.0 such that the 100 random numbers are normally distributed. Accordingly, the remote device 202 may remove the generated random numbers that do not fit the normal distribution.

Specific playback features may be incorporated in playback of the different results—for example, non-winning results may be played back to the user at a greater speed than winning results. The user may only be provided with a short animation of simulated spinning reels, with the non-winning results being shown to the user for a very short period of time. Then, the greater the win, the longer the time a user may be shown spinning reels. Reels may also be shown to stop in intervals, further building a user's anticipation.

A user may be allowed to tailor the manner in which results are presented to them, although the manner of providing results may be specified by a provider of the game. The rules relating to displaying results may be set at the electronic device 102, but may be stored on the electronic device 102 or at the remote device 202. As example, results may be provided to a user such that alternating winning and non-winning results are provided to a user. For example, one non-winning result, then a winning result, then a non-winning result, etc. Alternatively, groups including several non-winning and/or low value wins may be provided, followed by one high-winning result. Such groups may be consecutively provided to a user, so that low-value wins are interrupted by high-value wins.

If non-winning results are never transmitted to an electronic device 102, the total data to be transmitted will be reduced. If these results are transmitted, but not displayed to a user due to interpretation of rules on the electronic device 102, the speed at which a user is provided with results will be reduced due to the lower number of results displayed to the user. This will speed up gameplay and allow a user to increase their overall gameplay in an allotted time period.

It is envisaged that in a situation where there is an interruption in connectivity with the remote device 202, for example when an Internet connection is not available, a user may nonetheless be able to view the results, provided that a user device has received all the results.

The remote device 202 may be configured, possibly as a result of legal or regulatory requirement, to keep a record of gameplay results. This may enable accurate monitoring and reporting of RNG and overall game return-to-player (RTP), or pay-out, performance. This may also allow recovery of game results if, for some reason, a communications breakdown prevents a set of game results from being accurately transmitted by the remote device 202, or from being received by the electronic device 102.

In some embodiments, user input may be required to initiate subsequent spins. Alternatively, a user may be allowed to select whether subsequent results should automatically be shown to them at specific intervals, or if they wish to manually initiate the display of a next result.

It will be apparent that the volatility of the specific game in respect of which the current systems and method is implemented may impact the number of non-winning returns. A low volatility slot game may be expected to produce more winning results as a percentage of the total number of plays purchased, however, the average value of such wins may be relatively low. In contrast, a high-volatility slot game may produce relatively fewer winning results for the same number of plays, however, the average value of such wins may be higher. The volatility of a game may thus influence the number of winning and non-winning results to be transmitted from the remote device 202 to the electronic device 102. The RTP value, or pay-out percentage, of a slot game may influence the average pay-out of a game.

In the example described above with reference to FIGS. 8 to 20, a total of 979 credit were returned to the player on wagers totalling 1,000 credits. It will be apparent that the winnings may in some instances be more than the value of credits wagered, while in some instances it may be lower. The RTP, RNG, volatility, pay table and the like associated with the specific game may all influence the likely pay-out after a set number of spins.

The above embodiments only show a five column and three-row matrix in the game; however, any possible matrix configuration may be provided. Any suitable configuration of pay lines may form part of the game, or it may even be a ways game in which symbols may land on any position in subsequent columns. Pay-outs may also be from right to left, and not only from left to right on a pay line.

Furthermore, the present system and method is not limited to implementation in a reel-based slot game—any game of chance where a wager placed by a player, with a resultant win or loss, may utilize similar implementations. A user may, for example, bet on several roulette results, and may then be provided with results in a similar manner to that described above—re-arranged, with non-winning results removed, or the like. Similarly, these embodiments may apply to baccarat or other card games, etc., particularly where no user interaction is necessary after a wager is placed. If interaction necessary, may be able to specify actions to take in all circumstances, for example rules on how to process blackjack hands, rules on how to wager on side bets or bonus rounds, etc.

FIG. 21 depicts a flowchart showing operations of a method 500 that can, for example, be carried out using electronic device 102. In other examples, the operations of method 500 could be carried out by a different computing device with a display. Additionally, certain aspects of method 500 could also be carried out by a remote device 202 as well. Furthermore, it is noted that the functionality described in connection with the flowchart can be implemented as special-function and/or configured general-function hardware modules, a computer program or portions of program code executed by a processor for achieving specific logical functions, determinations, and/or steps described in connection with the flowchart shown in FIG. 21. Where used, program code can be stored on any type of computer-readable medium, for example, such as a storage device including a disk or hard drive.

In addition, each block of the flowchart shown in FIG. 21 may represent circuitry that is wired to perform the specific logical functions in the process. Unless specifically indicated, functions in the flowchart shown in FIG. 21 may be executed out of order from that shown or discussed, including substantially concurrent execution of separately described functions, or even in reverse order in some examples, depending on the functionality involved, so long as the overall functionality of the described method is maintained.

Block 502 includes providing, on a display associated with the gaming machine 102, a display area suitable for displaying gameplay and game results.

Block 504 includes awaiting, from a user, instructions on how to proceed.

Block 506 includes receiving, from a user, rules by which to manage game results.

Block 508 includes either storing the rules at the electronic device 102 for application when appropriate, or transmitting the rules to a remote device 202 for storage and application.

Block 510 includes receiving, from the user, a gameplay initiation instruction, which may be a spinning instruction in an appropriate situation. This instruction may be accompanied by information about a number of gameplays to be processed, as well as a wager to be associated with each instance of gameplay.

Block 512 includes requesting results for a number of gameplays from a remote device 202 associated with an appropriate RNG.

Block 514 includes receiving the results, as generated by the RNG, back from the remote device 202. The result may be modified according to the rules, as per the specific embodiment.

Block 516 includes, if rules are applied at the electronic device itself, applying the rules by re-organising and/or filtering the results, as appropriate. If the rules are applied at the remote device 202, this block may not be needed.

Block 518 includes providing the results to the user by displaying it on the display.

Block 520 includes processing the results at the electronic device 102.

V. Additional Example Embodiments

FIGS. 22 and 23 are flow charts illustrating example embodiments. The processes illustrated by FIGS. 22 and 23 may be carried out by a computing device, such as remote device 202 and/or electronic device 102. However, the process can be carried out by other types of devices or device subsystems.

The embodiments of FIGS. 22 and 23 may be simplified by the removal of any one or more of the features shown therein. Further, these embodiments may be combined with features, aspects, and/or implementations of any of the previous figures or otherwise described herein.

FIG. 22 depicts a flow chart showing operations of a method 600. As mentioned above, method 600 may be carried out by a computing device, such as remote device 202. The remote device may include a random number generator, a ruleset defining random number modifications, a processor, and memory which may contain instructions that, when executed by the processor, cause the remote device to perform operations outlined by method 600.

Block 602 includes receiving, by a remote device and from an electronic device, a single message including a request for a plurality of random numbers, wherein the remote device has stored therewith a ruleset defining random number modifications and is associated with a random number generator.

Block 604 includes obtaining, from the random number generator, the plurality of random numbers.

Block 606 includes applying, to the plurality of random numbers, the random number modifications.

Block 608 includes transmitting, to the electronic device and in response to the single message, the plurality of random numbers as modified.

The obtaining, applying and transmitting steps may occur in response to receiving the single message.

In some embodiments, the random number modifications indicate an order in which to sort the plurality of random numbers, and applying the random number modifications comprises sorting the plurality of random numbers in the order as indicated.

In some embodiments, the random number modifications indicate one or more conditions under which one or more of the random numbers are to be removed from the plurality of random numbers, and applying the random number modifications comprises: identifying a set of the random numbers to which the one or more conditions apply; and removing, from the plurality of random numbers, the set of the random numbers that was identified.

In some embodiments, the one or more conditions under which one or more of the random numbers is to be removed includes a condition to remove all numbers under a certain value.

In some embodiments, the one or more conditions under which the one or more of the random numbers is to be removed includes a condition to remove all numbers over a certain value.

In some embodiments, the operations further comprise: receiving, from the electronic device, a representation of the one or more conditions; and storing, in the remote device, the one or more conditions in association with the electronic device.

In some embodiments, the electronic device requests the plurality of random numbers for outcomes of a game, wherein the one or more conditions under which one or more of the random numbers is to be removed is a condition to remove all numbers representative of non-winning outcomes of the game.

In some embodiments, the random number generator is a pseudo random number generator.

In some embodiments, the random number generator is a true random number generator.

In some embodiments, the plurality of random numbers is to be used by the electronic device as basis for one or more cryptographic keys.

In some embodiments, the plurality of random numbers is to be used by the electronic device as basis for a discrete-event simulation.

In some embodiments, the plurality of random numbers is to be used by the electronic device for initializing weights in artificial neural networks.

In some embodiments, the plurality of random numbers is to be used by the electronic device for generating passwords.

In some embodiments, the operations further comprise: prior to receiving the single message: (i) receiving, from the electronic device, a representation of the random number modifications, and (ii) storing, in the ruleset, the random number modifications.

In some embodiments, the plurality of random numbers are to be used by the electronic device in outcomes of a wagering game.

In some embodiments, each of the plurality of random numbers represents either a non-winning outcome of the wagering game or a winning outcome of the wagering game, and the electronic device is configured to display non-winning outcomes at a greater speed than winning outcomes.

In some embodiments, the wagering game is a reel-based game consisting of a plurality of reels, and the non-winning outcomes and the winning outcomes are respectively represented by animated spins of the reels of the reel-based game.

In some embodiments, the winning outcomes have respectively associated values, and the winning outcomes are displayed at speeds that are proportional to their associated values.

In some embodiments, each of the plurality of random numbers represents either a non-winning outcome of the wagering game or a winning outcome of the wagering game, and the electronic device is configured to display winning outcomes between one or more non-winning outcomes.

In some embodiments, the remote device is configured to store one or more of: (i) a log representing the plurality of random numbers, or (ii) a log representing a return-to-player performance of the wagering game, wherein the return-to-player performance is a percentage of wagered amounts returned to players of the wagering game as winning outcomes.

In some embodiments, the remote device is configured to store a log representing the plurality of random numbers, and the operations further comprise: determining that the electronic device has lost and re-attained network connectivity with the remote device; and retransmitting, to the electronic device, the plurality of random numbers as modified.

Some embodiments may further involve receiving, from a plurality of further electronic devices, respective single messages including corresponding requests for further pluralities of random numbers; and in response to receiving each of the single messages: (i) obtaining, from the random number generator, a further plurality of random numbers; (ii) applying, to the further plurality of random numbers, the random number modifications; and (iii) transmitting, to the further electronic device from which the corresponding request was received, the further plurality of random numbers as modified.

FIG. 23 depicts a flow chart showing operations of a method 700, which, as mentioned above, may be carried out by a computing device, such as electronic device 102.

Block 702 includes providing, by way of a display associated with an electronic device, a display area suitable for displaying an application and application outcomes of the application.

Block 704 includes awaiting, from a user, instructions to proceed with the application.

Block 706 includes receiving, from the user, rules by which to manage the application outcomes.

Block 708 includes storing, in memory associated with the electronic device, the rules.

Block 710 includes receiving, from the user, an initiation instruction for the application.

Block 712 includes transmitting, to a remote device, a request for generation of a plurality of random numbers.

Block 714 includes receiving, from the remote device and in response to the request, a set of random numbers including at least some of the plurality of random numbers that were generated.

Block 716 includes applying, by the electronic device, the rules to the set of random numbers.

Block 718 includes providing, by way of the display, a set of application outcomes based on the set of random numbers.

Method 700 may also include any other operations herein, in particular, those described in the context of method 600 that could be performed on an electronic device or similar client-side device. As one particular example, method 700 may involve carrying out operations of the application that produce the application outcomes even when the electronic device is experiencing limited or no network connectivity.

VI. Conclusion

This detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be used, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including in substantially concurrent or in reverse order, depending on the functionality involved. Further, more or fewer steps, blocks and/or functions can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively, or additionally, a step or block that represents processing of information can correspond to a module, a segment, or a portion of program code (including related data). The program code can include one or more instructions executable by a processor for implementing specific logical functions or actions in the method or technique. The program code and/or related data can be stored on any type of computer-readable medium such as a storage device including a disk or hard drive or other storage media.

The computer-readable medium can include non-transitory computer-readable media such as computer-readable media that stores data for short periods of time like register memory, processor cache, and/or random-access memory (RAM). The computer-readable media can include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media can be any other volatile or non-volatile storage systems. A computer-readable medium can be considered a computer-readable storage medium, for example, or a tangible storage device.

Software for use in carrying out the invention can also be in transitory form, for example in the form of signals transmitted over a network such as the Internet. Moreover, a step or block that represents one or more information transmissions can correspond to information transmissions between software and/or hardware modules in the same physical device. However, other information transmissions can be between software modules and/or hardware modules in different physical devices.

Further, the described operations throughout this application need not be performed in the disclosed order, although in some examples, the recited order may be preferred. Also, not all operations need to be performed to achieve the desired advantages of disclosed machines and methods, and therefore not all operations are required.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While examples have been described in terms of select embodiments, alterations and permutations of these embodiments will be apparent to those of ordinary skill in the art. Other changes, substitutions, and alterations are also possible without departing from the disclosed machines and methods in their broader aspects as set forth in the following claims.

What is claimed is:

1. A remote device for resilient distribution of random numbers comprising:

a random number generator;

a ruleset defining random number modifications;

a processor; and memory containing program instructions that, when executed by the processor, cause the remote device to perform operations comprising:

receiving, from an electronic device, a single message including a request for a plurality of random numbers, wherein the electronic device requests the plurality of random numbers for outcomes of a game; and in response to receiving the single message: (i) obtaining, from the random number generator, the plurality of random numbers; (ii) applying, to the plurality of random numbers, the random number modifications, wherein the random number modifications indicate one or more conditions under which random numbers are to be removed from the plurality of random numbers, wherein the one or more conditions includes a condition to remove one or more numbers representative of non-winning outcomes of the game, wherein applying the random number modifications comprises (a) identifying a set of the random numbers to which the one or more conditions apply and (b) removing, from the plurality of random numbers, the set of the random numbers that was identified;

and (iii) transmitting, to the electronic device, after removing the set of the random numbers that was identified, the plurality of random numbers as modified.

2. The remote device of claim 1, wherein the remote device is configured to store a log representing the plurality of random numbers, and wherein the operations further comprise:

determining that the electronic device has lost and re-attained network connectivity with the remote device; and retransmitting, to the electronic device, the plurality of random numbers as modified.

3. The remote device of claim 1, wherein the one or more conditions under which one or more of the random numbers is to be removed includes a condition to remove all numbers under a certain value.

4. The remote device of claim 1, wherein the one or more conditions under which the one or more of the random numbers is to be removed includes a condition to remove all numbers over a certain value.

5. The remote device of claim 1, wherein the operations further comprise:

in response to receiving, from the electronic device, a representation of the one or more conditions:

storing, in the remote device, the one or more conditions in association with the electronic device.

6. The remote device of claim 1, wherein the random number generator is a true random number generator.

7. The remote device of claim 1, wherein the operations further comprise:

prior to receiving the single message: (i) receiving, from the electronic device, a representation of the random number modifications, and (ii) storing, in the ruleset, the random number modifications.

8. The remote device of claim 1, wherein the plurality of random numbers are to be used by the electronic device in outcomes of a wagering game.

9. The remote device of claim 8, wherein each of the plurality of random numbers represents either a non-winning outcome of the wagering game or a winning outcome of the wagering game, and wherein the electronic device is configured to display non-winning outcomes at a greater speed than winning outcomes.

10. The remote device of claim 9, wherein the wagering game is a reel-based game consisting of a plurality of reels, and wherein the non-winning outcomes and the winning outcomes are respectively represented by animated spins of the reels of the reel-based game.

11. The remote device of claim 9, wherein the winning outcomes have respectively associated values, and wherein the winning outcomes are displayed at speeds that are proportional to their associated values.

12. The remote device of claim 8, wherein each of the plurality of random numbers represents either a non-winning outcome of the wagering game or a winning outcome of the wagering game, and wherein the electronic device is configured to display winning outcomes between one or more non-winning outcomes.

13. The remote device of claim 8, wherein the remote device is configured to store one or more of: (i) a log representing the plurality of random numbers, or (ii) a log representing a return-to-player performance of the wagering game, wherein the return-to-player performance is a percentage of wagered amounts returned to players of the wagering game as winning outcomes.

14. The remote device of claim 8, wherein the operations further comprise:

receiving, from a plurality of further electronic devices, respective single messages including corresponding requests for further pluralities of random numbers; and in response to receiving each of the single messages: (i) obtaining, from the random number generator, a further plurality of random numbers; (ii) applying, to the further plurality of random numbers, the random number modifications; and (iii) transmitting, to the further electronic device from which the corresponding request was received, the further plurality of random numbers as modified.

15. The remote device of claim 1, wherein the random number modifications indicate an order in which to sort an arrangement of the plurality of random numbers, wherein applying the random number modifications comprises sorting the plurality of random numbers to arrange the plurality of random numbers in the order as indicated.

16. A computer-implemented method for resilient distribution of random numbers comprising:

receiving, by a remote device and from an electronic device, a single message including a request for a plurality of random numbers, wherein the remote device has stored therewith a ruleset defining random number modifications and is associated with a random number generator, wherein the electronic device requests the plurality of random numbers for outcomes of a game;

obtaining, from the random number generator, the plurality of random numbers;

applying, to the plurality of random numbers, the random number modifications, wherein the random number modifications indicate one or more conditions under which random numbers are to be removed from the plurality of random numbers, wherein the one or more conditions includes a condition to remove one or more numbers representative of non-winning outcomes of the game, wherein applying the random number modifications comprises (a) identifying a set of the random numbers to which the one or more conditions apply and (b) removing, from the plurality of random numbers, the set of the random numbers that was identified; and transmitting, to the electronic device, after removing the set of the random numbers that was identified, the plurality of random numbers as modified.

17. A non-transitory computer-readable medium for resilient distribution of random numbers comprising computer-implementable instructions configured to cause a processor of a remote device to perform operations comprising:

receiving, from an electronic device, a single message including a request for a plurality of random numbers, wherein the remote device has stored therewith a ruleset defining random number modifications and is associated with a random number generator, wherein the electronic device requests the plurality of random numbers for outcomes of a game;

obtaining, from the random number generator, the plurality of random numbers;

applying, to the plurality of random numbers, the random number modifications, wherein the random number modifications indicate one or more conditions under which random numbers are to be removed from the plurality of random numbers, wherein the one or more conditions includes a condition to remove one or more numbers representative of non-winning outcomes of the game, wherein applying the random number modifications comprises (a) identifying a set of the random numbers to which the one or more conditions apply and (b) removing, from the plurality of random numbers, the set of the random numbers that was identified; and transmitting, to the electronic device, after removing the set of the random numbers that was identified, the plurality of random numbers as modified.

18. The non-transitory computer-readable medium of claim 17, wherein the remote device is configured to store a log representing the plurality of random numbers, and wherein the operations further comprise:

determining that the electronic device has lost and re-attained network connectivity with the remote device; and retransmitting, to the electronic device, the plurality of random numbers as modified.

19. The non-transitory computer-readable medium of claim 17, wherein the operations further comprise:

in response to receiving, from the electronic device, a representation of the one or more conditions:

storing, in the remote device, the one or more conditions in association with the electronic device.

20. The non-transitory computer-readable medium of claim 17, wherein the operations further comprise:

prior to receiving the single message: (i) receiving, from the electronic device, a representation of the random number modifications, and (ii) storing, in the ruleset, the random number modifications.

* * * * *